US011455427B2

(12) United States Patent
Zhang et al.

(10) Patent No.: US 11,455,427 B2
(45) Date of Patent: Sep. 27, 2022

(54) SYSTEMS, METHODS, AND APPARATUSES FOR IMPLEMENTING A PRIVACY-PRESERVING SOCIAL MEDIA DATA OUTSOURCING MODEL

(71) Applicant: Arizona Board of Regents on Behalf of Arizona State University, Scottsdale, AZ (US)

(72) Inventors: Yanchao Zhang, Phoenix, AZ (US); Jinxue Zhang, Union City, CA (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 495 days.

(21) Appl. No.: 16/521,321

(22) Filed: Jul. 24, 2019

(65) Prior Publication Data

US 2020/0034566 A1    Jan. 30, 2020

Related U.S. Application Data

(60) Provisional application No. 62/702,837, filed on Jul. 24, 2018.

(51) Int. Cl.
*G06F 21/62* (2013.01)
*G06F 16/903* (2019.01)
(Continued)

(52) U.S. Cl.
CPC .... *G06F 21/6254* (2013.01); *G06F 16/90344* (2019.01); *G06F 16/9536* (2019.01); *G06Q 50/01* (2013.01)

(58) Field of Classification Search
None
See application file for complete search history.

(56) References Cited

U.S. PATENT DOCUMENTS 7,436,988 B2    10/2008 Zhang et al.
9,430,738 B1 *   8/2016 Hui ........................ G06N 5/022
(Continued)

OTHER PUBLICATIONS

Li, Y., et al., "Seeing Your Face is Not Enough: An Inertial Sensor-Based Liveness Detection for Face Authentication," ACM CCS'15, (Oct. 2015), pp. 1558-1569.
(Continued)

*Primary Examiner* — Kaveh Abrishamkar
(74) *Attorney, Agent, or Firm* — Elliott, Ostrander & Preston, P.C.

(57) ABSTRACT

In accordance with embodiments disclosed herein, there are provided methods and systems for implementing a privacy-preserving social media data outsourcing model. For example, there is disclosed a Data Services Provider (DSP) Framework system, which includes a receive interface to receive an unperturbed social media data set having social media data corresponding to each of a plurality of users represented therein; a data privacy engine to map the received unperturbed social media data set into a high-dimensional user-keyword matrix connecting each of the plurality of users represented with multi-variable keywords corresponding to each user's social media data within the unperturbed social media data set; the data privacy engine further to inject controlled noise generate as output, a perturbed user-keyword matrix which protects each of the plurality of users' privacy during a statistical query against the perturbed user-keyword matrix having the social media data of the plurality of users embodied therein by preventing an attacker from (i) inferring whether a targeted user by the attacker is one of the plurality of users or (ii) inferring whether any record is associated with the targeted user. Other related embodiments are disclosed.

20 Claims, 23 Drawing Sheets

(51) Int. Cl.
G06Q 50/00 (2012.01)
G06F 16/9536 (2019.01)

(56) References Cited

U.S. PATENT DOCUMENTS

| | | | |
|---|---|---|---|
| 9,594,896 B2 | 3/2017 | Rosati | |
| 9,642,543 B2 | 5/2017 | Banerjee et al. | |
| 9,842,891 B2 | 12/2017 | Yeh et al. | |
| 2016/0292455 A1* | 10/2016 | Ebara | G06F 16/9535 |
| 2019/0003327 A1 | 4/2019 | Chen | |
| 2019/0003421 A1 | 4/2019 | Zhang | |
| 2019/0332757 A1 | 10/2019 | Chen et al. | |
| 2019/0342103 A1 | 11/2019 | Zhang et al. | |
| 2019/0362064 A1 | 11/2019 | Zhang et al. | |
| 2019/0370866 A1* | 12/2019 | Lawbaugh | G06Q 30/0254 |
| 2020/0082121 A1* | 3/2020 | Hanafee | G06F 21/602 |

OTHER PUBLICATIONS

Liu, C., et al., "Dependence Makes You Vulnerable: Differential Privacy Under Dependent Tuples," NDSS, (Feb. 2016) San Diego, CA, 15 pages.
Liu, C., et al., "Linkmirage: Howto Anonymize Links in Dynamic Social Systems," NDSS, (Feb. 2016), San Diego, CA, 19 pages.
Lucas, B., et al., "An Iterative Image Registration Technique with an Application to Stereo Vision," IJCAI, vol. 81, (1981), pp. 674-679.
Mao, H., et al., "Loose Tweets: An Analysis of Privacy Leaks on Twitter," WPES, (Oct. 2011) Chicago, IL, 11 pages.
Mao, W., et al., "Cat: High-precision Acoustic Motion Tracking," ACM MobiCom, (Oct. 2016), New York, NY, USA, 13 pages.
Mittal, P., et al., "Preserving Link Privacy in Social Network Based Systems," NDSS, (Feb. 2013), San Diego, CA, 19 pages.
Määttä, J., et al., "Face Spoofing Detection From Single Images Using Micro-Texture Analysis," IEEE IJCB'11, (Oct. 2011), 7 pages.
Nandakumar, R., et al., "FingerIO: Using Active Sonar for Fine-grained Finger Tracking," ACM CHI, (May 2016), San Jose, CA, 11 pages.
Narayanan, A., et al., "De-anonymizing Social Networks," SP, (2009), 15 pages.
Nguyen, D., et al., ""How Old Do You Think I Am?"; A Study of Age in Twitter," ICWSM (Jul. 2013), Boston, IL, 10 pages.
Nilizadeh, S., et al., "Community-enhanced De-anonymization of Online Social Networks," CCS, (2014), Scottsdale, AZ, 12 pages.
Peeters, R., et al., "N-Auth: Mobile Authentication Done Right," ACSAC, (Dec. 2017), Orlando, FL, 15 pages.
Peng, C., et al., "Beepbeep: A High Accuracy Acoustic Ranging System Using COTS Mobile Devices," ACM Sensys LLC., (Nov. 2007), Sydney, Australia, 14 pages.
Poh, M.Z., et al., "Non-contact, automated cardiac pulse measurements using video imaging and blind source separation," Optics Express, vol. 18, No. 10, (May 2010), pp. 10792-10774.
Porter, M., "Readings in Information Retrieval," Ch. An Algorithm for Suffix Stripping, (1997), pp. 313-316 Morgan Kaufman Publishers Inc., 4 pages.
Qian, J., et al., "De-anonymizing Social Networks and Inferring Private Attributes Using Knowledge Graphs," INFOCOM, (2016) San Francisco, CA, USA, 9 pages.
Shahzad, M., et al., "Secure Unlocking of Mobile Touch Screen Devices by Simple Gestures: You can see it but you can not do it," ACM MobiCom'13, (Sep. 2013), 12 pages.
Shelley, K., et al., "Pulse Oximeter Waveform: Photoelectric Plethysmography," Clinical Monitoring, WB Saunders Company, (2001), pp. 420-428.
Shi, J., et al., "Good Features to Track," IEEE CVPR'94, (Jun. 1994), 33 pages.
Shirvanian, M., et al., "Two-factor Authentication Resilient to Server Compromise Using Mix-bandwidth Devices," NDSS, (Feb. 2014), San Diego, CA, 16 pages.
Shrestha, B., et al., "The Sounds of the Phones: Dangers of Zero-effort Second Factor Login Based on Ambient Audio," ACM CCS, (Oct. 2016) Vienna, Austria, 12 pages.
Sun, J., et al., "TouchIn: Sightless Two-factor Authentication on Multi-touch Mobile Devices," IEEE CNS'14, (Oct. 2014), 14 pages.
Szabo, T., "Time Domain Wave Equations for Lossy Media Obeying a Frequency Power Law," The Journal of the Society of America, vol. 96, No. 1 (1994), pp. 492-500.
Tai, C.-H., et al., "Identities Anonymization in Dynamics Social Networks," ICDM, (Dec. 11-14, 2011), Vancouver, BC, Canada, 6 pages.
Tan, X., et al., "Face Liveness Detection from A Single Image with Sparse Low Rank Bilinear Discriminative Model," ECCV'10, (Sep. 2010), 14 pages.
Tang, J., et al., "Line, Large-scale Information Network Embedding," Proceedings of the 24th International Conference on World Wide Web, ACM (2015) pp. 1067-1077.
Tang, L., et al., "Relational Learning Via Latent Social Dimensions," Proceedings of the 15th ACM SIGKDD International Conference on Knowledge Discovery and Data Mining, ACM (2009), pp. 817-826.
Tian, F., et al., "Learning Deep Representations for Graph Clustering," AAAI (2014) pp. 1293-1299.
Tomasi, C., et al., "Detection and Tracking of Point Features," School of Computer Science, Carnegie Mellon University, 1991, 22 pages.
Twilio Inc., "Authy," https://www.authy.com (2018), 3 pages.
Twitter, "Twitter api," [Online] Available: https://dev.twitter.com/rest/public (2018), 1 page.
Verkruysse, W., et al., "Remote plethysmographic imaging using ambient light," Optics Express, vol. 16, No. 26, (2008), pp. 21434-21445.
Viola, P., et al., "Rapid Object Detection Using a Boosted Cascade of Simple Features," IEEE CVPR'01, (Dec. 2001), 11 pages.
Wang, G., et al., "Outsourcing Privacy-preserving Social Networks to a Cloud," INFOCOM, (Apr. 14-19, 2013), Turin, Italy, 9 pages.
Wang, Q., et al., "Messages Behind the Sound: Real-time Hidden Acoustic Signal Capture with Smartphones," ACM MobiCom, (Oct. 2016), New York City, NY, 13 pages.
Wang, W., et al., "Performance Prediction of a Synchronization Link for Distributed Aerospace Wireless Systems," The Scientific World Journal, vol. 2013 (Jul. 2013), 8 pages.
Wei, T., et al., "mtrack: High-precision passive tracking using millimeter wave radios," ACM MobiCom, (Sep. 2015) Paris, France, 13 pages.
Weir, C., et al., "Usable Security: User Preferences for Authentication Methods in Ebanking and the Effects of Experience," Interacting with Computers, vol. 22, No. 3, (Oct. 2009), pp. 153-164.
Wu, L., et al., "Adaptive Spammer Detection with Sparse Group Modeling," ICWSM, (2017) pp. 319-326.
Wu, L., et al., "Detecting Camouflaged Content Polluters," ICWSM, (2017), pp. 696-699.
Wu, L., et al., "Detecting Crowdturfing in Social Media," Encyclopedia of Social Network Analysis and Mining, (2017), 12 pages.
Wu, L., et al., "Gleaning Wisdom from the Past: Early Detection of Emerging Rumors in Social Media," Proceedings of the 2017 SIAM International Conference on Data Mining, SIAM, (2017), pp. 99-107.
Wu, L., et al., "Mining Misinformation in Social Media," Big Data in Complex and Social Networks (2016), pp. 123-152.
Wu, L., et al., "Relational Learning with Social Status Analysis," Proceedings of the Ninth ACM International Conference on Web Search and Data Mining, ACM (2016) pp. 513-522.
Xu, S., et al., "Robust efficient estimation of heart rate pulse from video," Biomedical Optics Express, vol. 5, No. 4, (Mar. 2014), pp. 1124-1135.
Xu, y., et al, "Virtual U: Defeating Face Liveness Detection by Building Virtual Models from Your Public Photos," USENIX Association, 25th USENIX Security Symposium (Aug. 10-12), 2016, 17 pages.
Yanardag, P., et al., "Deep Graph Kernels," Proceedings of the 21th ACM SIGKDD International Conference on Knowledge Discovery and Data Mining, ACM, (2015), pp. 1365-1374.

(56) References Cited

OTHER PUBLICATIONS

U.S. Appl. No. 16/782,349, Beigi et al., filed Feb. 5, 2020.
"An Exhaustive Study of Twitter Users Across the World," http://temp.beevolve.com/twitter-statistics/ (Oct. 2012), 13 pages.
Ahmed, F., et al., "Social Graph Publishing with Privacy Guarantees," ICDCS, (Aug. 11, 2016), Nara, Japan, 10 pages.
Andrés, M., et al., "Geo-indistinguishability: Differential Privacy for Location-Based Systems," CCS (2013) Berlin Germany, 14 pages.
Asthana, A., et al., "Incremental Face Alignment in the Wild," IEEE CVPR'14, (Jun. 2014), 8 pages.
Blum, A., et al., "A Learning Theory Approach to Non-interactive Database Privacy," STOC, (2008), Victoria, British Columbia, Canada, 9 pages.
Chen, D., et al., "S2M: A Lightweight Acoustic Fingerprints-based Wireless Device Against Data Theft," IEEE Internet of Things Journal, vol. 4, No. 1, (2017) pp. 88-100.
Chen, D., et al., "Wireless Device Authentication Using Acoustic Hardware Fingerprints," BigCom, (Aug. 2015), Taiyuan, China, 23 pages.
Chen, S., et al., "Sensor-Assisted Facial Recognition: An Enhanced Biometric Authentication System for Smartphones," ACM MobiSys'14, (Jun. 2014), 14 pages.
Chen, X., et al.,"A Comparative Study of Demographic Attribute Inference in Twitter," ICWSM, (May 2015) Oxford, England, 4 pages.
Chen, Y. et al, "Your Face Your Heart: Secure Mobile Face Authentication with Photoplethysmograms," IEEE Infocom 2017—IEEE Conference on Computer Communications (2017), 9 pages.
Chen, Y., et al., "Your Song Your Way: Rhythm-Based Two-Factor Authentication for Multi-Touch Mobile Devices," IEEE INFOCOM'15, (Apr.-May 2015), 9 pages.
Czeskis, A., "Strengthening User Authentication Through Opportunistic Cryptographic Identity Assertions," ACM CCS, (Oct. 2012) Raleigh, NC, 11 pages.
D. Inc., "Duo Push," (2018) https://www.duosecrurity.com/product/methods/duo-mobile, 6 pages.
Das, A., et al., "Do You Hear What I Hear? Fingerprinting Smart Devices Through Embedded Acoustic Components," ACM CCS, (Nov. 2014), Scottsdale, AZ, 12 pages.
Derham, T., et al., "Design and Evaluation of a Low-cost Multistatic Netted Radar System," IET Radar, Sonar & Navigation, vol. 1 No. 5 (Oct. 2007), 7 pages.
Dey, R., et al., "Estimating Age Privacy Leakage in Online Social Networks," INFOCOM, (2012), 5 pages.
Dey, R., et al., "Facebook Users Have Become Much More Private: A Large-Scale Study," IEEE PERCOM Workshops (Mar. 19-23, 2012), Lugano, Switzerland, 7 pages.
Dwork, C., "Differential Privacy," Automata, Languages and Programming, (2011), Encyclopedia of Cryptography and Security. Springer, Boston, MA, 3 pages.
Encap Security Inc., "Encap Security," (2018) https://www.encapsecurity.com/, 10 pages.
Friedman, N., et al., "Bayesian Network Classifiers," Machine Learning, vol. 29, No. 2-3, (1997), pp. 131-163.
Fung, B., et al., "Privacy-preservingData Publishing: A Survey of Recent Developments," ACM Computing Surveys, vol. 42, No. 4, (2010) pp. 14:1-14:52.
Gadkari, P., "How Does Twitter Make Money?," http://www.bbc.com/news/business-24397472, (Nov. 2013), 14 pages.
Ghiass, R., et al., "Infared Face Recognition: A Literature Review," IEEE IJCNN'13, (Aug. 2013), 10 pages.
Goodin, D., "RSA Breach Leaks Data for Hacking SecurID Tokens" (Mar. 18, 2011) https://goo.gl/PRkb95, 7 pages.
Goodin, D., "RSA SecurID Software Token Cloning: A New How-to," (2012) https://goo.gl/Vy32JP, 5 pages.
Google Inc., "Google 2-Step Verification," (2018) https://www.google.com/landing/2step/, 6 pages.
Gregoski, M., et al., "Development and Validation of a Smartphone Heart Rate Acquisition Application for Health Promotion and Wellness Telehealth Applications," International Journal of Telemedicine and Applications, vol. 2012, (2012), 7 pages.
Gunson, N., et al., "User Perceptions of Security and Usability of Single-factor and Two-factor Authentication in Automated Telephone Banking," Computers & Security, vol. 30, No. 4, (Jun. 2011), pp. 208-220.
Hall, M., et al., "The WEKA Data Mining Software: An Update," ACM SIGKDD Explorations Newsletter, vol. 11, No. 1, (2009), pp. 10-18.
Han, D., et al., "Proximity-Proof: Secure and Usable Mobile Two-Factor Authentication," MobiCom '18 Proceedings of the 24th Annual International Conference on Mobile Computing and Networking (2018), pp. 401-415.
Hanley, J., et al., "The Meaning and Use of the Area Under a Receiver Operating Characteristic (ROC) Curve," Radiology, vol. 143, No. 1, 1982, pp. 29-36.
Haykin, S., "A Comprehensive Foundation," Neural Networks, vol. 2, Chapter 4 (2004), 100 pages.
Haykin, S., et al., "Least-Mean-Square Adaptive Filters," John Wiley & Sons, vol. 31, (2003), 11 pages.
Hom, E., "Mobile Device Security: Startling Statistics on Data Loss and Data Breaches," Channel Pro Network, https://www.channelpronetwork.com/article/mobile-device-security-startling-statistics-data-loss-and-data-breaches, obtained on Apr. 9, 2020, 6 pages.
Http://resources.alcatel-lucent.com/asset/189669, 2016, 17 pages.
Https://i-msdn.sec.s-msft.com/dynmig/IC584331.png, obtained on Jun. 10, 2020, 1 page.
Ji, S., et al., "On Your Social Network De-anonymizability: Quantification and Large Scale Evaluation with Seed Knowledge," NDSS, (Feb. 2015), San Diego, CA, 15 pages.
Karapanos, N., et al., "Sound-proof. Usable Two-factor Authentication Based on Ambient Sound," USENIX Security (Aug. 2015) Washington DC, 17 pages.
Kähm, O., et al., "2D Face Liveness Detection: an Overview," IEEE BIOSIG'12, (Sep. 2012), pp. 171-182.
Kollreider, K., et al., "Non-intrusive liveness detection by face images," Image and Vision Computing, vol. 27, No. 3, (Feb. 2009), pp. 233-244.
Kulpa, K., "Continuous Wave Radar-monostatic, Multistatic and Network," Advances in Sensing with Security Applications, (2006), pp. 215-242.
Kumar, M., et al., "DistancePPG: Robust non-contact vital signs monitoring using a camera," Biomedical optics express. vol. 6, No. 5, (May 2015), pp. 1565-1588.
Kumparak, G., "Slicklogin Wants to Kill the Password by Singing a Silent Song to Your Smartphone/," (2013), https://goo.gl/RBGkX3, 10 pages.
Lam, A., et al., "Robust Heart Rate Measurement from Video Using Select Random Patches," IEEE CVPR'15, (Dec. 2015), pp. 3640-3648.
Leskovec, J., et al., "Mining Massive Datasets," Ch. Data Mining, (2014), Cambridge University Press, pp. 7-9.
Lewandowska, M., et al., "Measuring Pulse Rate with a Webcam—a Non-contact Method for Evaluating Cardiac Activity," IEEE FedCSIS'11, (Sep. 2011), pp. 405-410.
Li, L., et al., "Unobservable Re-authentication for Smartphones," NDSS'13, (Feb. 2013), 16 pages.
Li, R., et al., "Towards Social User Profiling: Unified and Discriminative Influence Model for Inferring Home Locations," KDD, (Aug. 2012) Beijing, China, 9 pages.
Li, T., et al., "iLock: Immediate and Automatic Locking of Mobile Devices Against Data Theft," ACM CCS'16, (Oct. 2016), pp. 933-944.
Li, X., et al., "Remote Heart Rate Measurement from Face Videos Under Realistic Situations," IEEE CVPR'14, (Jun. 2014), pp. 4264-4271.
Yang, J., et al., "Community Detection in Networks with Nodes Attributes," Data Mining ICDM IEEE 2013 13th International Conference on IEEE, (2013) pp. 1151-1156.
Yubico Inc., "Yubikey Hardware," (2018), https://yubico.com/, 3 pages.

(56) References Cited

OTHER PUBLICATIONS

Zhang, J., et al., "Privacy-preserving Social Media Data Outsourcing," http://cnsg.asu.edu/papers/xzhangINFOCOM18Full.pdf (2018) Honolulu, HI, USA, 9 pages.

Zhang, J., et al., "Your Actions Tell Where You Are: Uncovering Twitter Users in A Metropolitan Area," IEEE CNS, (Sep. 2015) Florence Italy, 9 pages.

Zhang, J., et al., "Your Age is No. Secret: Inferring Microbloggers' Ages Via Content and Interaction Analysis," ICWSM, (May 2016) Cologne, Germany, 10 pages.

Zhou, Z., et al., "Acoustic Fingerprinting Revisited: Generate Stable Device ID Stealthy with Inaudible Sound," ACM CCS, (Nov. 2014) Scottsdale, AZ , 12 pages.

* cited by examiner

| Algorithm 1: Perturbation alg. for mechanism $K_r(f_I(\cdot))$ |
|---|
| Input : $r_{\max}, \gamma, \mathcal{D} = \{U_1, \ldots, U_n\}$ <br> Output: Perturbed dataset $\mathcal{D}' = \{U'_1, \ldots, U'_n\}$ |
| 1      Compute $\epsilon$ according to Eq. (11); |
| 2      For each $U_i, i = 1, \ldots, n$ ; |
| 3      Select a random number $p \in [0, 1]$, and compute the radius $d$ according to Eq. (9) ; |
| 4      Select a random vector $N \in \mathbb{R}^m$, and normalized it to have unit $L_2$ norm, i.e., $\Theta = N/\|N\|_2$ ; |
| 5      $U'_i = U_i + d\Theta$ ; |

FIG. 5

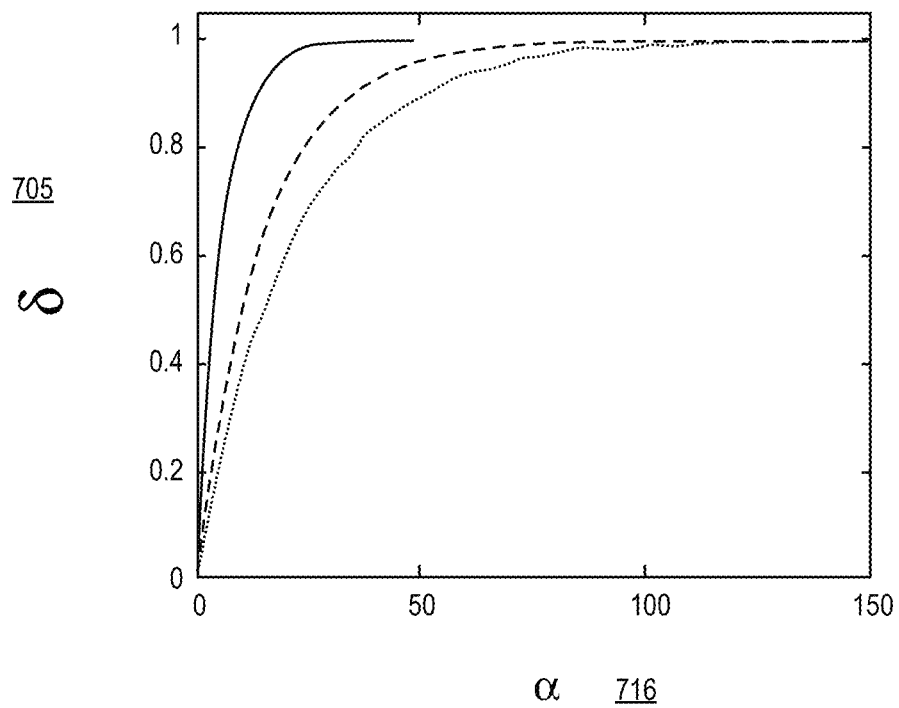
(a) $\gamma = 10^{-8}$
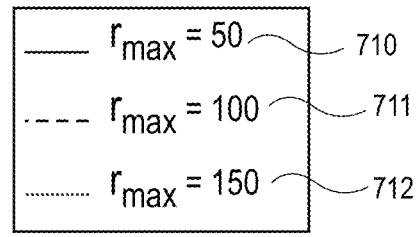
FIG. 7B

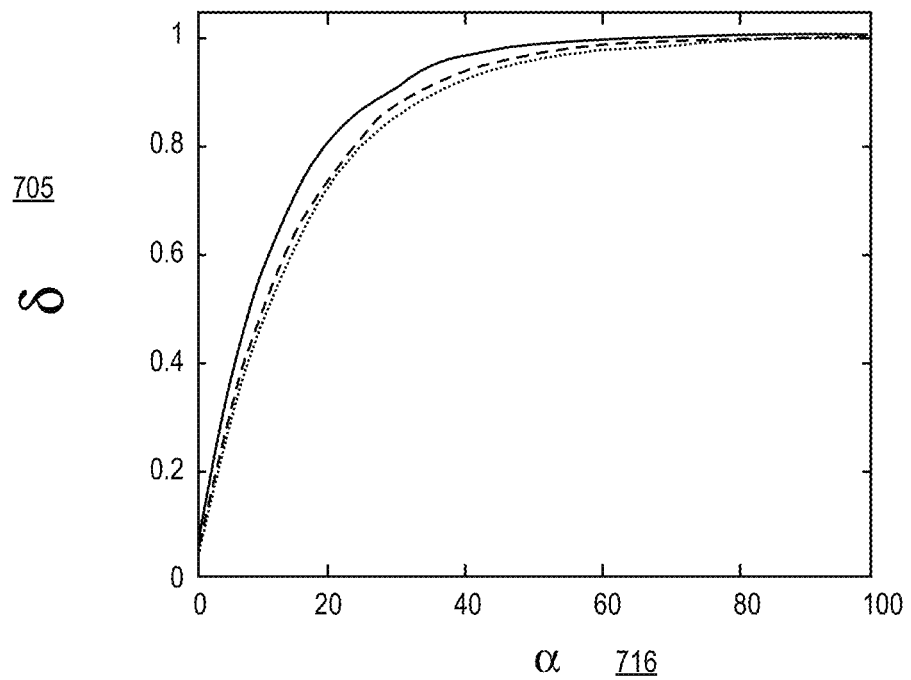
(b) $r_{max} = 100$
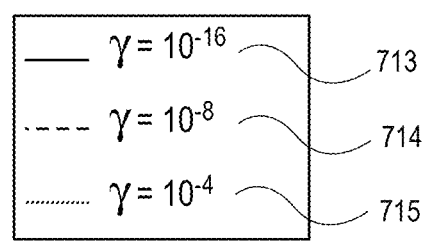
FIG. 7C

(a) $m = 1000$

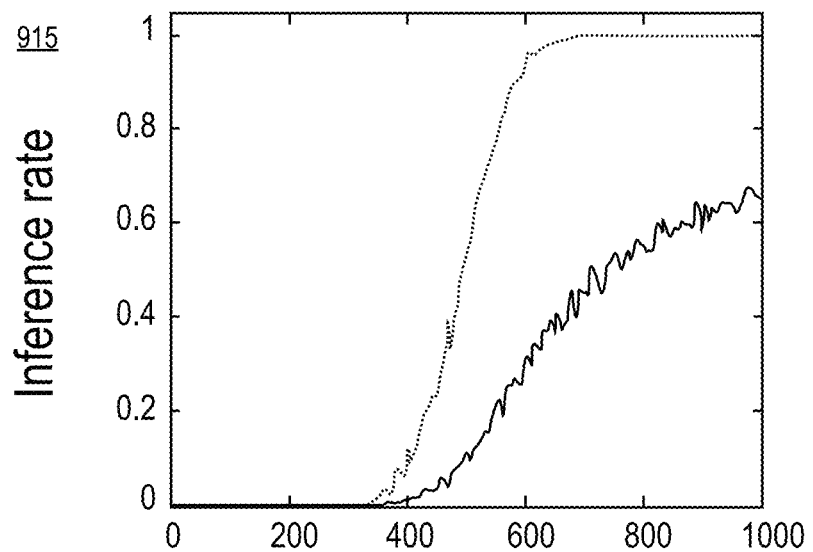
(a) $K = 1$, $r_{max} = 100$
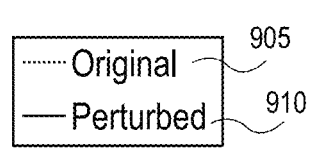
FIG. 9A

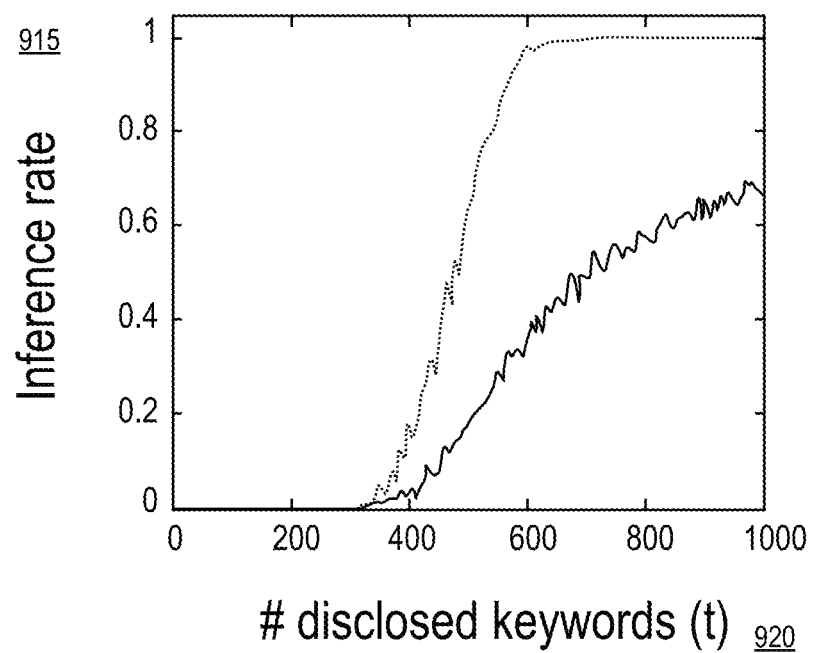
(b) $K = 10$, $r_{max} = 100$
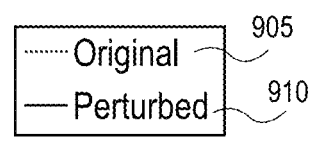
FIG. 9B (b) $K = 10$, $r_{max} = 100$

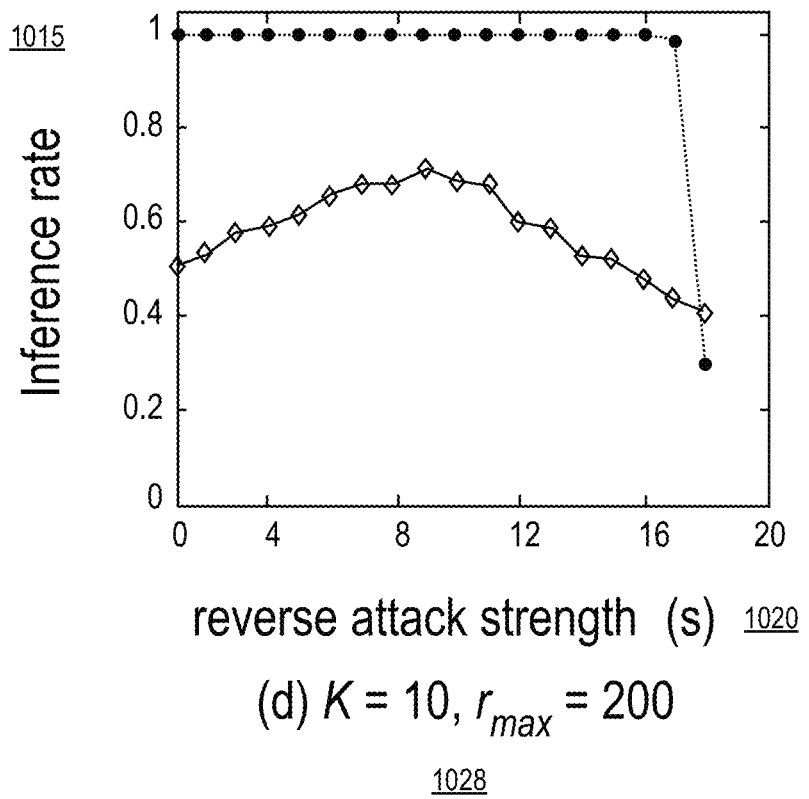
(d) $K = 10$, $r_{max} = 200$
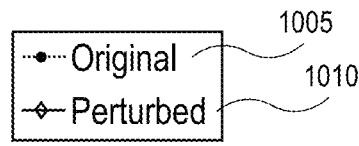
FIG. 10D

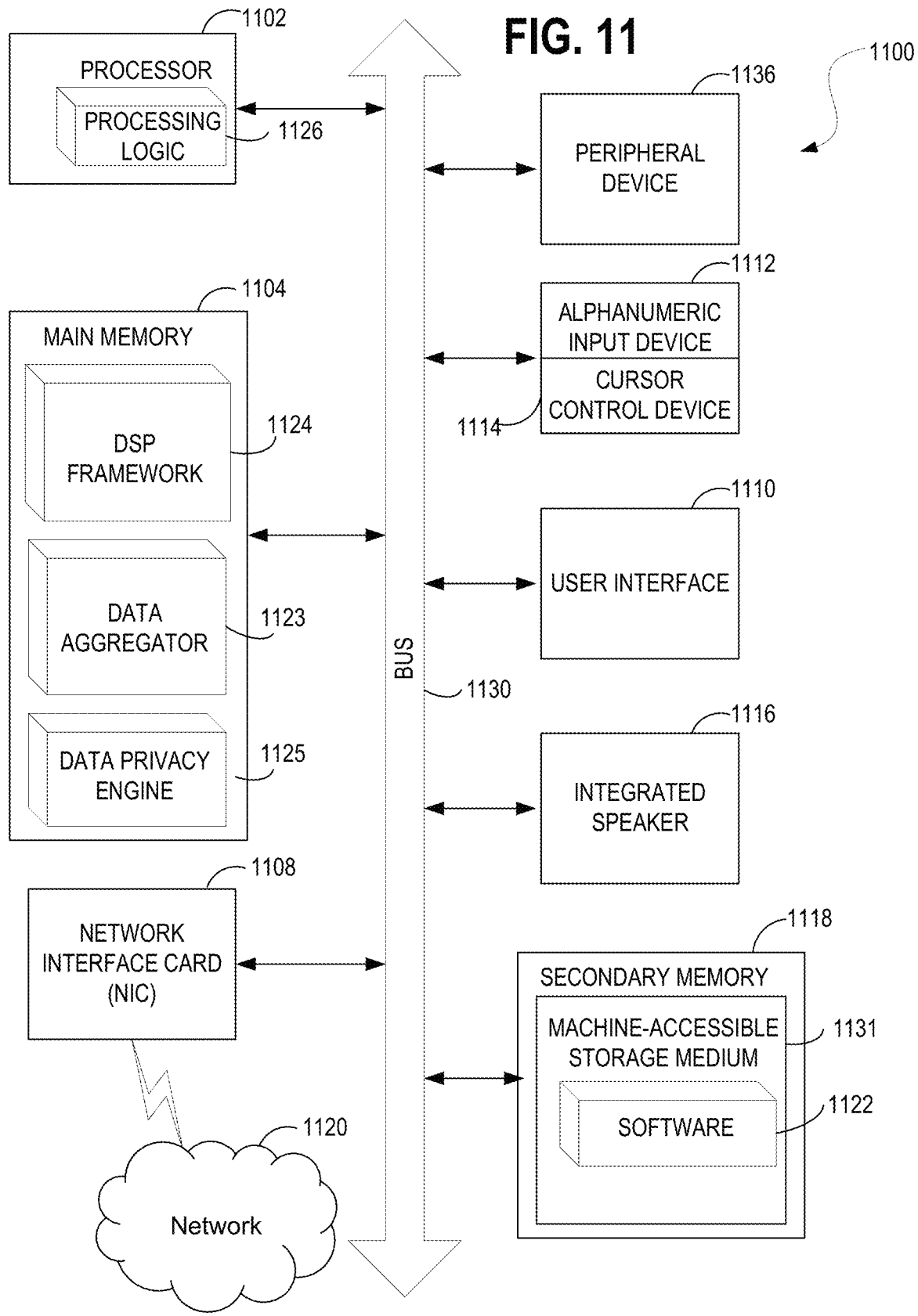

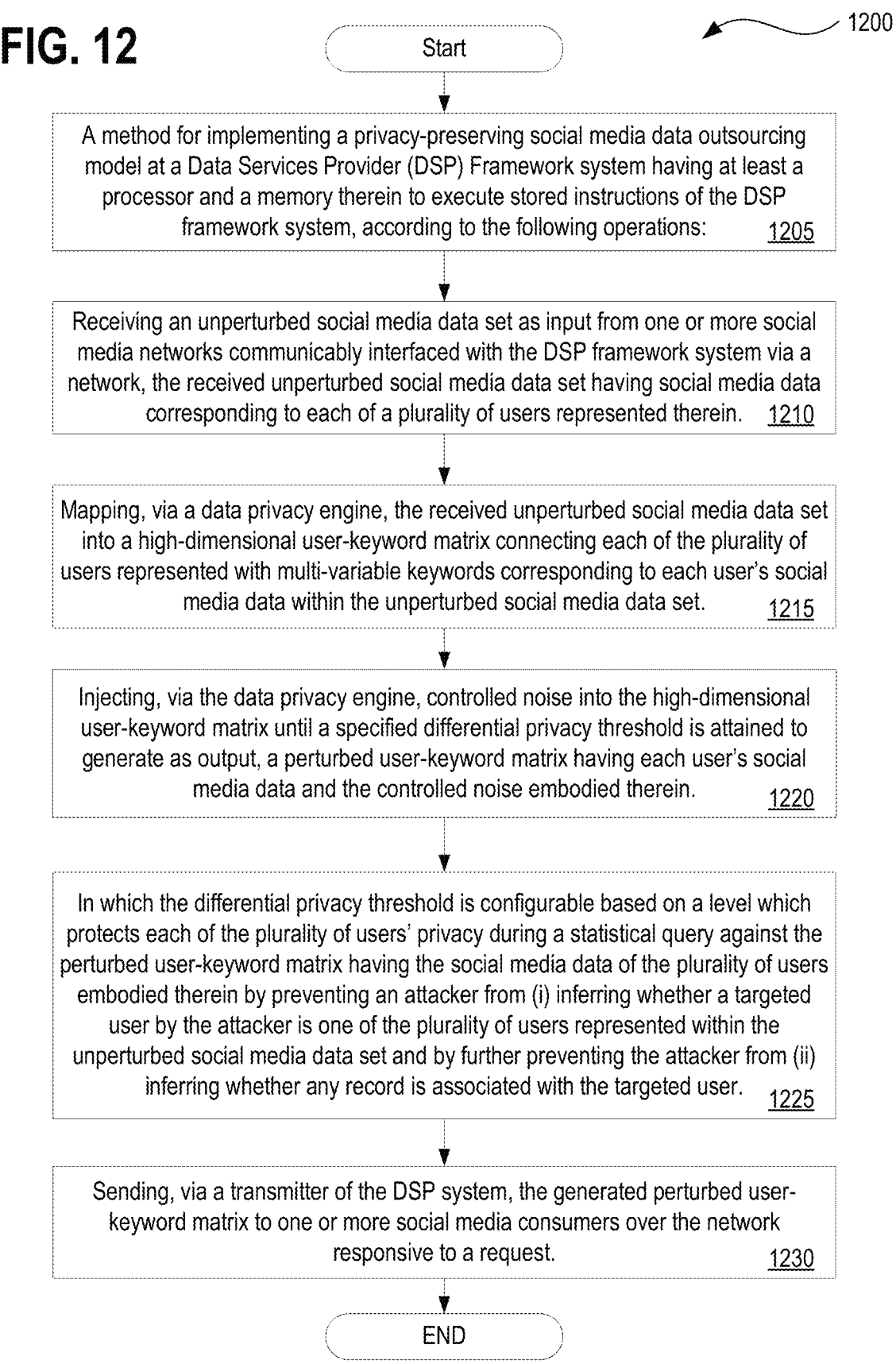

SYSTEMS, METHODS, AND APPARATUSES FOR IMPLEMENTING A PRIVACY-PRESERVING SOCIAL MEDIA DATA OUTSOURCING MODEL

CLAIM OF PRIORITY

This US utility patent application is related to, and claims priority to the U.S. provisional application entitled "SYSTEMS, METHODS, AND APPARATUSES FOR IMPLEMENTING A PRIVACY-PRESERVING SOCIAL MEDIA DATA OUTSOURCING," filed Jul. 24, 2018, having an application No. of 62/702,837 and, the entire contents of which are incorporated herein by reference.

GOVERNMENT RIGHTS AND GOVERNMENT AGENCY SUPPORT NOTICE

This invention was made with government support under W911NF-16-1-0117 awarded by Army Research Office. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of cloud computing, and more particularly, to systems, methods, and apparatuses for implementing a privacy-preserving social media data outsourcing model in conjunction with a cloud-based computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

The use of crowd-sourced or "user-generated social media data" is growing at exponential rates creating a very high demand in both the public and private sectors. Unfortunately, the disclosure of unperturbed social media data servers further exacerbates current threats to user privacy without providing workable user privacy solutions.

Because such user-generated social media data is closely tied to human beings in the physical world, such large-scale social media data present tremendous usage opportunities for a variety of data consumers. Certain among these data consumers have already become some of the most profitable resources for social media service providers. The disclosure of unperturbed social media data presents a natural conflict between data utility and user privacy within the context of social media data outsourcing. For instance, on the one hand, data consumers want unperturbed social media data to maximize the data utility, which is also the most profitable case for social media service providers. Unfortunately, maximum data utility is achieved at the biggest sacrifice of user privacy. On the other hand, social media service providers are also motivated to protect user privacy due to legal concerns, public relations, marketing, and many other business and economic reasons. For example, social media service providers may intentionally introduce randomized noise to the data before releasing. Thus, in practice, user privacy is better protected, but at the loss of data utility.

The marketplace needs a solution which optimizes maximum data utility while at the same time avoiding any further degradation to user data privacy, or where possible, maintains or improves both maximum data utility and user data privacy.

Described herein are solutions to anonymized real user data within a provided dataset, so as to mitigate attacks that seek to pinpoint actual users or individually identify real users within such a dataset based on those users' unprotected text data within the dataset. The embodiments described herein therefore aim to provide increased user privacy by anonymizing not only user IDs but entire user data, such as the whole text of social media user tweets and posts. Further provided is a framework for differentially privacy-preserving social media data outsourcing, such that social media data service providers can outsource perturbed datasets, thus providing users differential privacy while nevertheless maintaining maximum data utility to social media data consumers.

In such a way, embodiments of the invention improve a social media consumer's utility and thus in turn, improve a computer's efficiency when utilized by such a social media consumer, by eliminating the need for processing extraneous noise in the data through dimensionality reduction techniques to reduce a quantity of features or variables under consideration, yet maintaining user data privacy through differential privacy and obfuscation of a real-user's identity from being correlated to that same user's unprotect text data, thus reducing CPU and memory processing and consumption in comparison to prior approaches.

The present state of the art may therefore benefit from systems and methods for implementing a privacy-preserving social media data outsourcing model as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 5 depicts a perturbation algorithm $K_r(f_r(\cdot))$, in accordance with described embodiments;

FIGS. 7B and 7C depict further experimental data from implementation of the described embodiments, specifically showing the usefulness of the mechanism, in accordance with described embodiments;

FIGS. 9A, 9B, 9C, and 9D depict the performance of an inference attack I, in which the attacker has knowledge o at least part of a user's data, in accordance with described embodiments;

FIGS. 10A, 10B, 10C, and 10D depict the performance of an inference attack II, in which an attacker knows more or potentially all of a user's data, in accordance with described embodiments;

FIG. 11 illustrates a diagrammatic representation of a machine in the exemplary form of a computer system, in accordance with one embodiment, within which a set of instructions, for causing the machine/computer system to perform any one or more of the methodologies discussed herein, may be executed; and FIG. 12 depicts another flow diagram illustrating a method for implementing a privacy-preserving social media data outsourcing model within a computing environment, in accordance with described embodiments.

DETAILED DESCRIPTION

Figure 1:
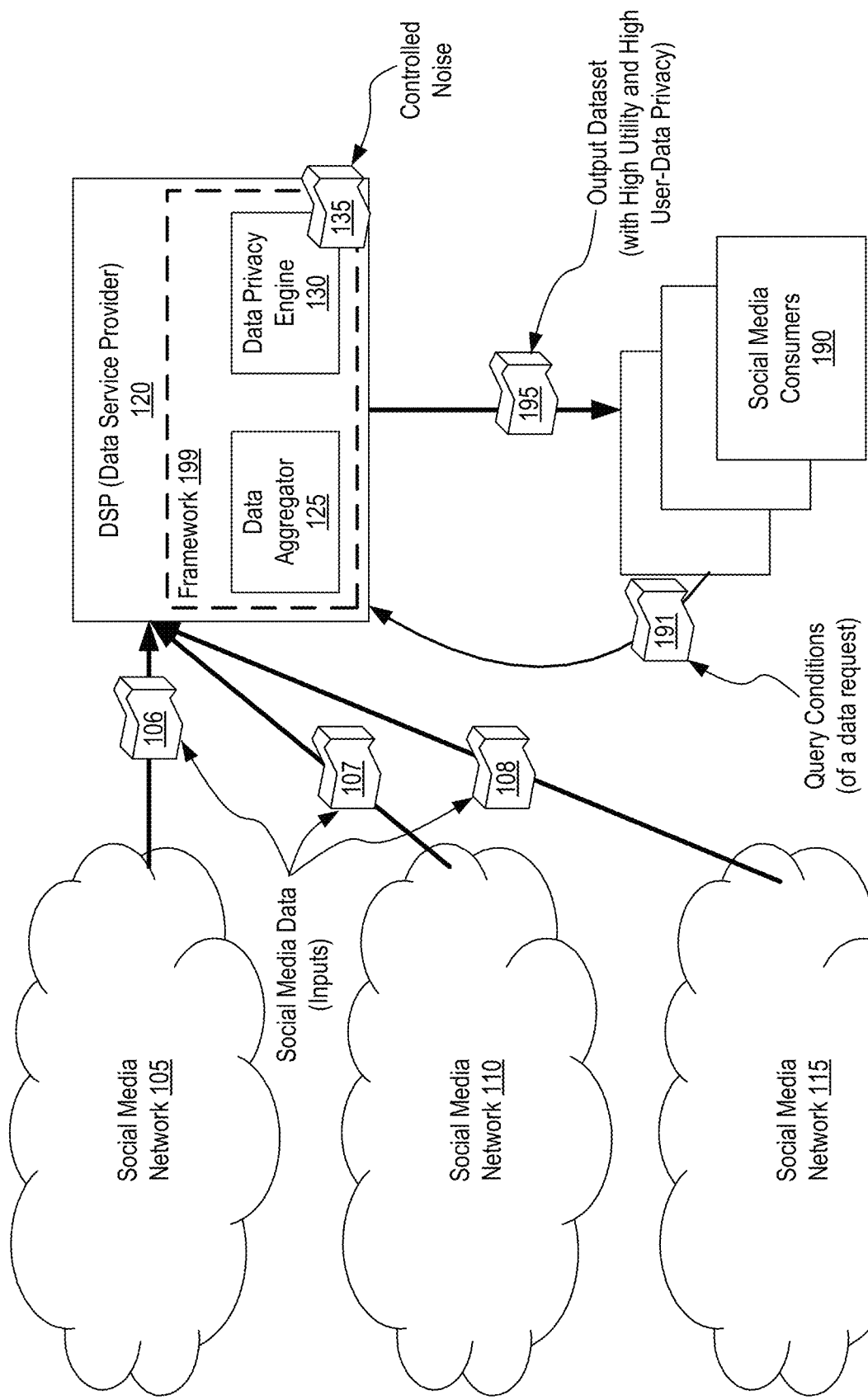
FIG. 1 depicts an exemplary framework which implements a privacy-preserving social media data outsourcing model, in accordance with described embodiments.

Described herein are methods and systems for implementing a privacy-preserving social media data outsourcing model as is described herein. For example, there is described in accordance with a particular embodiment, a Data Services Provider (DSP) Framework system, which includes a memory to store instructions; a processor to execute instructions stored within the memory; a receive interface to receive an unperturbed social media data set as input from one or more social media networks communicably interfaced with the DSP framework system via a network, the received unperturbed social media data set having social media data corresponding to each of a plurality of users represented therein; a data privacy engine to map the received unperturbed social media data set into a high-dimensional user-keyword matrix connecting each of the plurality of users represented with multi-variable keywords corresponding to each user's social media data within the unperturbed social media data set; the data privacy engine further to inject controlled noise into the high-dimensional user-keyword matrix until a specified differential privacy threshold is attained to generate as output, a perturbed user-keyword matrix having each user's social media data and the controlled noise embodied therein; wherein the differential privacy threshold is configurable based on a level which protects each of the plurality of users' privacy during a statistical query against the perturbed user-keyword matrix having the social media data of the plurality of users embodied therein by preventing an attacker from (i) inferring whether a targeted user by the attacker is one of the plurality of users represented within the unperturbed social media data set and by further preventing the attacker from (ii) inferring whether any record is associated with the targeted user; and a transmitter to send the generated perturbed user-keyword matrix to one or more social media consumers over the network responsive to a request.

As described herein, utility of data refers to the ability to mine social media data for statistical, marketing, or other purposes based on processing social media tweets or posts by keywords and presenting this information to social media data consumers filterable based on the associated demographics of social media users who created or interacted with these tweets or posts.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a specialized and special-purpose processor having been programmed with the instructions to perform the operations described herein. Alternatively, the operations may be performed by a combination of hardware and software. In such a way, the embodiments of the invention provide a technical solution to a technical problem.

Embodiments also relate to an apparatus for performing the operations disclosed herein. This apparatus may be specially constructed for the required purposes, or it may be a special purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various customizable and special purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

In addition to various hardware components depicted in the figures and described herein, embodiments further include various operations which are described below. The operations described in accordance with such embodiments may be performed by hardware components or may be embodied in machine-executable instructions, which may be used to cause a special-purpose processor programmed with the instructions to perform the operations. Alternatively, the operations may be performed by a combination of hardware and software, including software instructions that perform the operations described herein via memory and one or more processors of a computing platform.

FIG. 1 depicts an exemplary framework 199 which implements a privacy-preserving social media data outsourcing model, in accordance with described embodiments.

In particular, there is depicted here a data service provider (DSP) 120, within which the framework 199 operates. Further depicted within Framework 199 are both a data aggregator 125 and also a data privacy engine 130 which operates to receive and integrate controlled noise 135 pursuant to described embodiments.

Connected with the Data Service Provider (DSP) 120 are multiple social media networks 105, 110, and 115, each providing social media data 106, 107, and 108 as input into the Data Service Provider 120, which processes, aggregates, and improves the utility and privacy of the input data before then transmitting an output dataset 195 to the social media consumers 190 depicted here, in which the transmitted output dataset 195 has both high utility and high user-data privacy, in contrast with prior social media data outsourcing models which either diminished utility of such data through the introduction of random noise or other obfuscation means or alternatively, maintained high data utility by providing unperturbed user social media data which comprised user-data privacy by subjecting such user-data to text-based user-linkage attacks.

As noted above, a solution is needed which both protects user-generated social media data, while also maximizing the utility of such data without introducing computational burden upon a specialized computing system configured to process such data on behalf of a social media data consumer.

Because social media data is so closely tied to human beings in the physical world, it is important to many social media data set providers to protect the privacy of the users represented within the dataset. While at the same time, it is the unperturbed social media data which presents the greatest utility to social media data consumers and which puts the represented users' data privacy at greatest risk.

Consider for example a text-based user-linkage attack on data provided pursuant to current data outsourcing practices, in which the real users represented within an anonymized dataset can be easily pinpointed based on the users' unprotected text data.

Therefore, a framework is described herein for providing a differentially privacy-preserving social media data outsourcing model. According to described embodiments, utilizing the provided framework, social media data service providers outsource perturbed datasets to provide users differential privacy while offering high data utility to social media data consumers. For example, according to one embodiment, a particular differential privacy mechanism utilizes an $\epsilon$-text indistinguishability approach, which has been demonstrated to successfully thwart text-based user-linkage attacks. Extensive experiments on both real-world and synthetic datasets confirm that the described framework enables both high-level differential privacy protection to protect the represented users' data privacy, while also delivering high data utility to the social media data set consumers.

The term indistinguishability or a so-called "ciphertext indistinguishability" is a property of many encryption schemes. A cryptosystem which possesses the property of indistinguishability means that an attacker, malicious actor, or other adversary, simply will not be able to distinguish pairs of ciphertexts based on the message they encrypt. The property of indistinguishability under a chosen plaintext attack is considered a basic requirement for most provably secure public key cryptosystems, though some schemes also provide indistinguishability under chosen ciphertext attack and adaptive chosen ciphertext attack. Indistinguishability under a chosen plaintext attack may be considered as equivalent to the property of semantic security, and many cryptographic proofs use such definitions interchangeably. Therefore, a cryptosystem may generally be considered secure in terms of indistinguishability when no adversary, given an encryption of a message randomly chosen from a two-element message space determined by the adversary, can identify the message choice with probability significantly better than that of random guessing (½). If any adversary can succeed in distinguishing the chosen ciphertext with a probability significantly greater than ½, then this adversary is considered to have an "advantage" in distinguishing the ciphertext, and the scheme is not considered secure in terms of indistinguishability. This definition encompasses the notion that in a secure scheme, the adversary should learn no information from seeing a ciphertext. Therefore, the adversary should be able to do no better than if it guessed randomly.

With respect to the embodiments set forth here, it is feasible for an attacker to have many messages, therefore improving the attackers ability to conduct a user-linkage attack to infer identity, and therefore, embodiments set forth herein disclose means by which to introduce controlled noise to counter-act such attack schemes and dramatically worsen the attackers probability of success.

According to described embodiments, the framework 199 enables privacy-preserving social media data outsourcing, converting the social media input 106, 107, and 108 into user privacy protected yet highly valuable output dataset 195. The framework 199 of the Data Service Provider (DSP) 120 consumes input streams representing numerous social media users and many data consumers. The DSP 120 may be either a social media service provider itself, such as Twitter or Facebook, or may represent a third-party data company such as Gnip and DataSift, which operate to resell the data obtained from social media service providers, represented here as social media networks 105, 110, and 115. Data consumers, represented here as social media consumers 190, may be arbitrary individuals or entities in public or private sectors which are interested in, or seek to obtain statistical information that can be mined from the social media data inputs 106, 107, and 108, rather than being interested in the specific "real user IDs" uniquely identifying individuals in the physical world.

According to an exemplary embodiment, a social media consumer 190 (e.g., a data consumer) submits a data request to the DSP 120, which specifies the query conditions 191. According to such an embodiment, the DSP 120 responds to the incoming data request and query conditions 191 with an output dataset 195 (e.g., output data), specifying social media data satisfying the query conditions, in which each user is anonymized.

Although there can be various attacks on social media data outsourcing models, a user-linkage attack is very often the first effort for a malicious actor. In such a user-linkage attack, a malicious data consumer attempts to link random or selected anonymous IDs in a received data set to the corresponding real IDs on the social media platform. The purpose is therefore for the malicious actor to inappropriately obtain the latest social media data about the victims or other sensitive information not covered by the permissible query conditions 191 submitted to the Data Service Provider 120. While prior outsourcing models remain vulnerable to such an attack strategy, the output dataset 195 returned by the DSP 120 as described herein overcomes this susceptibility by preserving both link privacy and vertex privacy in the anonymized data set returned via the output dataset 195, such that the attacker cannot uncover real IDs based on either vertexes or edges.

Figure 2:
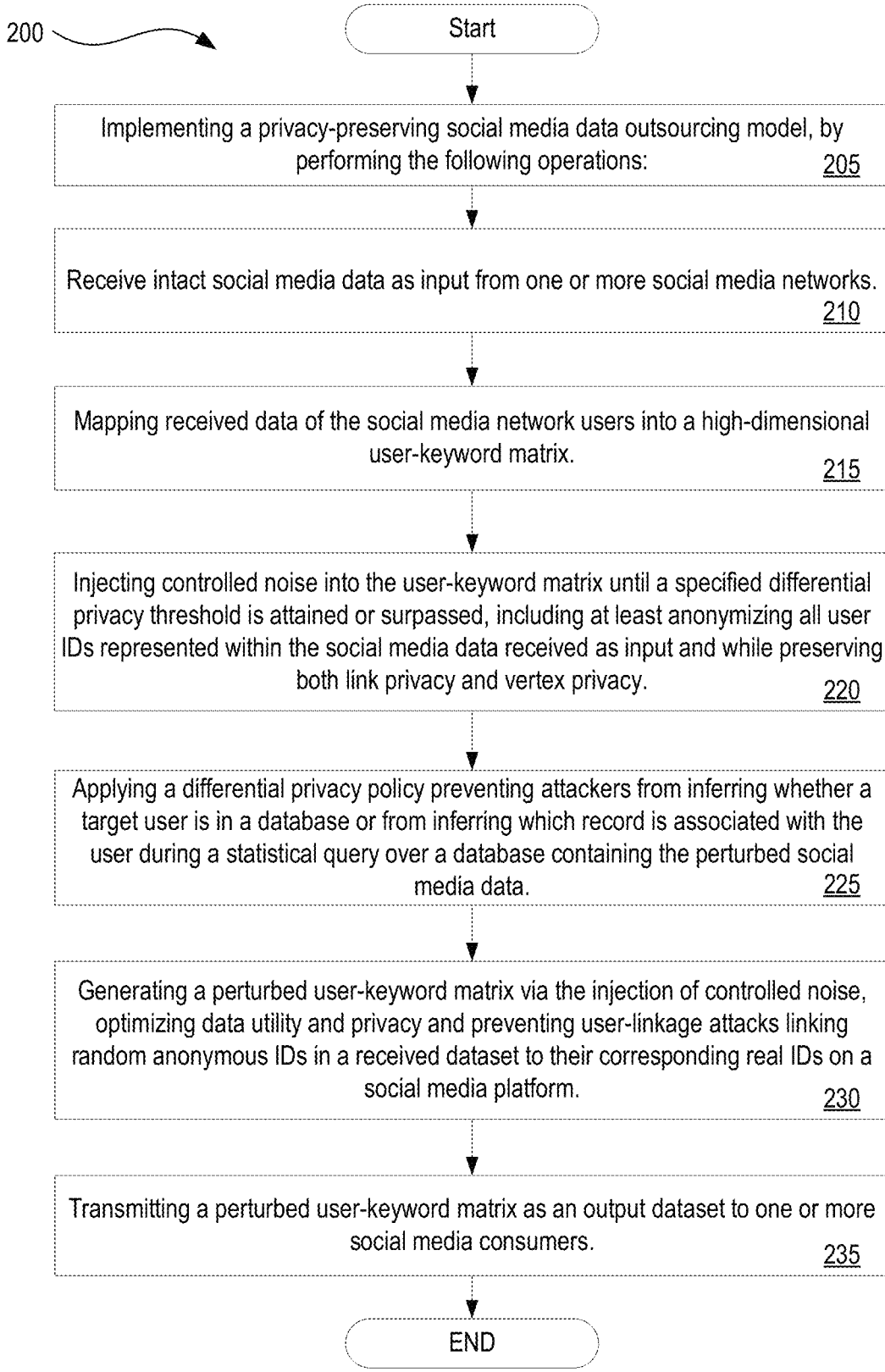
FIG. 2 depicts a flow diagram illustrating a method for implementing a privacy-preserving social media data outsourcing model within a computing environment such as a database system implementation, in accordance with described embodiments.

FIG. 2 depicts a flow diagram illustrating a method 200 for implementing a privacy-preserving social media data outsourcing model within a computing environment such as a database system implementation supported by a processor and a memory to execute such functionality to provide cloud based on-demand functionality to users, customers, and subscribers.

Method 200 may be performed by processing logic that may include hardware (e.g., circuitry, dedicated logic, programmable logic, microcode, etc.), software (e.g., instructions run on a processing device) to perform various operations such as executing, transmitting, receiving, analyzing, triggering, pushing, recommending, defining, retrieving, parsing, persisting, exposing, loading, operating, generating, storing, maintaining, creating, returning, presenting, interfacing, communicating, querying, processing, providing, determining, displaying, updating, sending, etc., in pursuance of the systems and methods as described herein. For example, the Data Service Provider (DSP) 120, the data aggregator 125 and the data privacy engine 130 as depicted at FIG. 1, and the other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 200 depicted at FIG. 2, at block 205, processing logic performs a method for implementing a privacy-preserving social media data outsourcing model by performing the following operations.

At block 210, processing logic receives unperturbed social media data as input from one or more social media networks.

At block 215, processing logic maps received data of the social media network users into a high-dimensional user-keyword matrix connecting users with multi-variable keywords in their social media data.

At block 220, processing logic injects controlled noise into the user-keyword matrix until a specified differential privacy threshold is attained or surpassed, including at least anonymizing all user IDs represented within the social media data received as input while preserving both link privacy and vertex privacy.

At block 225, processing logic applies a differential privacy policy preventing attackers from inferring whether a target user is in a database or from inferring which record is associated with the user during a statistical query over a database containing the perturbed social media data.

At block 230, processing logic generates a perturbed user-keyword matrix via the injection of controlled noise, optimizing data utility and privacy and preventing user-linkage attacks linking random anonymous IDs in a received dataset to their corresponding real IDs on a social media platform.

At block 235, processing logic transmits the perturbed user-keyword matrix as an output dataset to one or more social media consumers in response to a data request from a social media consumer.

Such a defense against the user-linkage attack, as described herein, consists of three steps, in accordance with one embodiment.

First, unperturbed data of all the users is mapped into a high-dimensional user-keyword matrix. The high-dimensional user-keyword matrix involves a matrix comprising rows and columns, with each row representing a single tweet and each column representing a single keyword from each tweet. Each keyword in the matrix is thus a dimension. The high-dimensionality of the matrix involves its ability to exclude unnecessary keywords in a tweet such as definite articles ("the"), conjunctions ("and"), pronouns ("he"), prepositions ("by") and verbs ("is").

Second, controlled noise is added to the user-keyword matrix to satisfy differential privacy. Adding controlled noise to anonymize and increase the privacy of data itself, in addition to anonymizing user identification, may involve adding a particular selection of different keywords or artificial keywords into the high-dimensional user-keyword matrix that are configured and evaluated statistically to have either have minimal effect or to have no effect on the utility of the data (thus, adding "controlled" keywords or noise instead of arbitrary or random keywords which could potentially result in an uncontrolled change to the utility or meaning of the data).

Third, the perturbed user-keyword matrix is disclosed to the data consumer as the output dataset 195, where each user ID is anonymized. If the social graph corresponding to the data set is also needed, existing defenses are adopted to preserve both link privacy and vertex privacy. Such attack defense mechanisms apply to a wide range of social media applications. For example, the data consumer can infer demographic information about the target population from the perturbed data set.

In such a way, the framework 199 enables differentially privacy-preserving social media data outsourcing, thus allowing social media data service providers to outsource perturbed datasets to provide users differential privacy while offering high data utility to social media data consumers.

Addressing the problem of privacy-preserving social media data outsourcing has not yet been overcome by previously known techniques, much less, a complete system for receiving, processing, and outputting social media user data in a format which operates to both guarantee differential user privacy while maintaining high data utility in social media data outsourcing. The previously known Laplacian mechanism which is known to achieve differential privacy critically suffers from the curse of high dimensionality and thus brings huge noise into the original dataset which in turn significantly reduces data utility, increases CPU and memory processing and consumption.

In statistics, machine learning, and information theory, dimensionality refers to the quantity of features or variables under consideration, and high dimensionality is the presence of too great of quantity of features or variables under consideration. There consequently is a general aim to reduce dimensionality, where possible. Dimensionality reduction or dimension reduction is the process of reducing the number of random variables under consideration by obtaining a set of principal variables through the application of either or both feature selection and feature extraction. Feature selection attempts to identify a subset of the original variables, also called features or attributes, through one of a filter strategy to obtain information gain, a wrapper strategy providing a search guided by accuracy, and an embedded strategy via which features are selected to be added or be removed while building the model based on the prediction errors. Conversely, feature extraction utilizes an initial set of measured data and then builds derived values, referred to as features, which are selected on the basis of being both informative and non-redundant, thus facilitating the subsequent learning and generalization steps, and in some cases leading to improved human interpretations. Regardless of the approach, a lower-dimensional representation of a dataset is the ultimate objective so as to preserve as much information as possible about the original data while eliminating extraneous random variables to the extent feasible.

The framework described herein for implementing the metric $\epsilon$-text indistinguishability provides a mechanism by which to break this noise introduction and resulting dimensionality constraint, with experimental results demonstrating that high-level privacy protection is achievable without significantly sacrificing data utility. For example, experiments show that the described mechanism reduces the privacy leakage by as much as 64.1% while simultaneously reducing utility by only 1.61% in terms of classification accuracy.

As described herein, user-generated social media data is rapidly growing and in high demand in the public and private sectors. The disclosure of unperturbed social media data exacerbates the threats to user privacy. Means are described herein by which to identify a text-based user-linkage attack on current data outsourcing practices, in which the real users in an anonymized dataset can be pinpointed based on the users' unprotected text data. The described framework (e.g., FIG. 1, element 199) provides for differentially privacy-preserving social media data outsourcing. Utilizing framework 199, social media data service providers can outsource perturbed datasets to provide users differential privacy while offering high data utility to social media data consumers, and more particularly, through the use of differential privacy based on a novel notion of $\epsilon$-text indistinguishability, which operates to thwart the text-based user-linkage attack. Extensive experiments on real-world and synthetic datasets confirm the disclosed framework successfully enables high-level differential privacy protection and also high data utility.

It is well known that user-generated social media data are exploding with, for example, Twitter, being the most popular microblogging service amongst them. Twitter alone generates 500 million tweets per day by 328 million monthly active users, by mid-2017. Facebook, the largest online social network with about 1.3 billion daily active users by mid-2017, generates petabytes of data per day. People use social media platforms to communicate with their friends, share their daily life experiences, express their opinions on political/social events and commercial products, etc. Closely tied to human beings in the physical world, large-scale social media data have tremendous usages by various data consumers and have become one of the most profitable resources for social media service providers.

Companies use social media data to study customer behavior, monitor public responses to their products, deliver online advertisements more cost-effectively, and uncover the trends that may impact their businesses; public policy makers explore social media data to obtain the demographic information for making strategic decisions; and sociologists leverage social media data to study the social behavior and establish new social network theories.

In a typical social media mining application, a data consumer demands a set of users and their social media data (such as profiles, recent posts, and friends), which satisfy some desirable criterion. For example, company A may request the data of all the users who mentioned the company name in the past week after a public relation crisis.

The disclosure of unperturbed social media data exacerbates the threats to user privacy. For example, many users mention their vacation plans in publicly visible tweets without knowing that criminals can exploit such information for targeted break-ins and thefts. Criminals may identify potential victims nearby by directly browsing/searching social media platforms, and smarter ones can explore the search APIs offered by social media platforms. The data acquired in this traditional way are only small and random samples of all the qualifying data. For example, Twitter claims that their Search API only "searches against a sampling of recent tweets published in the past 7 days." If the criminals could access unperturbed social media data relevant to the target area, they can identify all potential victims to plan large-scale break-ins.

In addition, social media mining applications are increasingly sophisticated and powerful. If unperturbed social media data are available, lots of sensitive information the users do not explicitly disclose could still be inferred, such as age, location, language, and political preferences.

There is a natural conflict between data utility and user privacy in social media data outsourcing. On the one hand, data consumers want unperturbed social media data to maximize the data utility, which is also the most profitable case for social media service providers. The maximum data utility is achieved unfortunately at the biggest sacrifice of user privacy. On the other hand, social media service providers are also motivated to protect user privacy due to legal concerns, public relations, and many other reasons. For example, they may intentionally add random noise to the data before it is released. User privacy is thus better protected but at the loss of data utility. A growing body of work studies privacy-preserving outsourcing of social graphs and falls into two directions. The first line of research aims at vertex privacy by outsourcing social graphs with anonymous user IDs, and the effort is to prevent the adversary from linking anonymous IDs to corresponding users in the real social network. The other line of research targets link privacy, and the main effort is to outsource social graphs with real user IDs but perturbed links by deleting real edges and adding fake ones. Neither line of work considers the privacy of user data and thus cannot be directly applied in our context.

Accordingly, a framework (e.g., FIG. 1, element 199) for privacy-preserving social media data outsourcing is described herein, with such a framework operating on behalf of a data service provider (DSP), numerous social media users, and many data consumers. The DSP can be either a social media service provider itself such as Twitter or Facebook, or a third-party data company such as Gnip and DataSift which resells the data obtained from social media service providers.

Data consumers can be arbitrary individuals or entities in public or private sectors. They are interested in statistical information that can be mined from social media data, rather than real user IDs. A data consumer submits a data request to the DSP, which specifies the query conditions. The DSP responds with social media data satisfying the query conditions, in which each user is anonymized. Although there can be various attacks on social media data outsourcing, a user-linkage attack is often the first effort along this line. In this attack, a malicious data consumer attempts to link random or selected anonymous IDs in the received data set to real IDs on the social media platform, so he can obtain the latest social media data about the victims or other sensitive information not covered by his previous query. This is assuming that existing sophisticated techniques are adopted to preserve both link privacy and vertex privacy in the anonymized data set, so the attacker cannot uncover real IDs based on either vertexes or edges.

The enabled defense against the user-linkage attack as described herein consists of at least three principle operations. First, the framework maps the unperturbed data of all the users into a high-dimensional user-keyword matrix. Second, the framework adds controlled noise to the user-keyword matrix to satisfy differential privacy. Finally, the perturbed user-keyword matrix is disclosed to the data consumer by the framework, where each user ID is anonymized. If the social graph corresponding to the data set is also needed, existing defenses are adopted to preserve both link privacy and vertex privacy.

The defense provided by the framework applies to a wide range of social media applications. For example, the data consumer can infer demographic information about the target population from the perturbed data set. The disclosed framework is therefore the first to coin the problem of privacy-preserving social media data outsourcing and to provide a system model by which to solve the problem. The framework further provides a novel mechanism to guarantee differential user privacy while maintaining high data utility in social media data outsourcing. The framework operates upon a newly defined metric called $\epsilon$-text indistinguishability, to design a mechanism by which to break this constraint.

Experimentation upon a real-world dataset with regard to user privacy and data utility provides results that show that high-level privacy protection can be achieved without significantly sacrificing data utility. For example, experimental implementation of the described framework shows a reduction to privacy leakage by as much as 64.1% while reducing only 1.61% of utility in terms of classification accuracy.

Social Media Data Outsourcing:

Consider a system with three parties: social media users, social media data service providers, and data consumers.

Social media users use the social media to connect with their friends and/or ones they have followed and generate the original texts configuring themselves as either private or public users. Public users are searchable either directly via the social media service provider's website or APIs or from the external tool such as Google. By setting his/her profile private, a private user only allows the authenticated users to access the profile and is not searchable from other users. However, the social media service provider still has full access to all the private and public data per user agreements. The social media data service provider (or DSP for short) hosts and provides most likely paid access to social media data. A DSP (e.g., element 120, FIG. 1) can be a social media service provider such as Twitter or Facebook itself. Alternatively, DSP 120 may be an emerging third-party data company such as Gnip or DataSift, which partners with social media service providers to provide social media data services. For example, Gnip and DataSift both have authorized access to Twitter's Firehost engine whereby to have access to complete, unperturbed, and real-time Twitter data. The DSP 120 can outsource the data according to the privacy policies and agreements which users consent to when signing up for using social media services.

Generally, the DSP 120 has full rights to use all the hosted data for their businesses and also share the data with data consumers. For example, the DSP 120 can sample the whole user space according to data consumers' requests, assign an anonymous ID to each sampled user, process the original data from each user according to data requests, and finally deliver the processed data to data consumers. Data consumers purchase social media data in the user-keyword format from the DSP whereby to run various social media mining algorithms for extracting useful information.

A data consumer can be an individual, a business, a government agency, a research institution, or any other entity in public and private sectors aware of the growing importance of social media data. A data consumer typically sends the DSP a request specifying its query conditions, pays for the request, and then receives the user-keyword data. For example, company A may request the data of all the users on the West Coast who have tweeted the keyword "company A" in the past week. After receiving the data from the DSP 120, the data consumer can explore advanced social media mining algorithms to identify critical market trends and analyze the users' demographic information such as age, location, education level, income level, marital status, occupation, religion, and family size. A data consumer currently cannot obtain unperturbed social media data without the DSP's support.

Adversary Model (User-Linkage Attack)

The DSP 120 is assumed to be fully trusted by both social media users and data consumers. Some advanced social media users may be privacy-aware and have taken some actions to protect their privacy. For example, statistics show that 11.84% of Twitter users and 52.8% of Facebook users set their accounts as private, respectively. Nevertheless, the DSP 120 may retain access to the complete data despite the users' privacy settings, according to various embodiments.

In addition, the users' effort to protect their privacy fails in the presence of the attack as described herein. The framework 199 therefore defends against the user-linkage attack, which can be launched by a curious or even malicious data consumer. Assume that the DSP 120 has anonymized every user ID in the dataset and also taken existing defenses such as to guarantee link and vertex privacy. There are two possible versions of the user-linkage attack. In the first version, the attacker locates some target users by random browsing or searching via public APIs on the social media platform. It knows that these users must be in the received dataset under anonymous IDs.

Existing defenses only consider link and vertex privacy via various obfuscation mechanisms, and no attention has been paid to text data. Armed with the text data of the target users with real IDs, the attacker can easily locate the corresponding anonymous IDs in the dataset. In the same way, the attacker can link the real IDs of the initial target users' friends to the corresponding anonymized IDs, and so on. The attacker eventually can uncover all the mappings between real and anonymous IDs in the dataset, despite the DSP's 120 anonymization efforts even based on existing advanced defenses. In the second version of the user-linkage attack, the attacker tries to learn more beyond the received dataset. The malicious actor starts by finding some interesting posts/tweets in the anonymized dataset and then easily locating the real users by performing simple text matching on the social networks. Once the real users are located, the attacker can learn their latest information.

Framework Functionality:

Consider the following problem within the aforementioned social media data outsourcing framework. After receiving a data query from the data consumer, the DSP 120 searches the entire social media database to generate a dataset D, which contains all the users satisfying the query and their outsourced texts (e.g., tweets, retweets, and replies) during the period specified in the query. Each user in D is assigned an anonymous ID to provide baseline user privacy. The data consumer may also request the social graph associated with D, in which case we assume that existing defenses such are adopted to preserve link and vertex privacy such that it is infeasible to link an anonymous ID to the real user based on his/her vertex's graphical property in the social graph. DSP 120 therefore transforms the raw dataset D into a new one D' by perturbing the user texts according to the following three requirements: (I) Completeness: each data item in D can be mapped to a unique item in D', and vice versa. In other words, no user is added to or deleted from D to create D'. (II) Privacy Preservation: The user texts in D' can be used to link any anonymous ID in D' to the real user with negligible probability, meaning that text-based user-linkage attacks can be thwarted with overwhelming probability. (III) High Utility: D' and D should lead to comparable utility at the data consumer on common data mining tasks such as statistical aggregation, clustering, and classification.

Given the preceding objectives and functionality, a novel technique to achieve differentially privacy-preserving social media data outsourcing with the aforementioned design functionality is provided utilizing text-indistinguishability as a foundational technique.

As noted above, social media service providers such as Facebook and Twitter currently outsource the original data set D to the data consumer, which contains the unperturbed user texts. We assume that there are n users in D, each assigned an anonymous ID. There are two obvious drawbacks here. First, although this method can enable the maximum data utility, it is vulnerable to the text-based user-linkage attack. Second, the data consumer cannot directly use the original texts which are highly unstructured and noisy. For example, common machine learning algorithms such as SVM and K-means require the input for each user to be a vector. Therefore, from the perspectives of both privacy protection and data usability, the DSP 120 needs to transform each user's texts into a numerical vector.

Here text modeling is utilized to achieve the required output. For example, stop words are removed in a stop-word list, in which the words such as "the" and "those" are considered more general and meaningless. For instance, in natural language processing, useless words (data), general words, and meaningless words are sometimes referred to as stop words. A stop word is a commonly used word (such as "the", "those", "a", "an", "in") that a search engine has been programmed to ignore, both when indexing entries for searching and when retrieving them as the result of a search query.

Then stemming is utilized to reduce inflected words to their stem forms such that the words with different forms can be related to the same word. For example, "play", "playing", and "played" are all reduced to "play". Next, we represent the keyword space for the cleansed texts using a T-gram technique, which is widely used for statistical text analysis. The T-gram technique splits a given message into sequences of T contiguous words, each referred to as a T-gram with $\tau$ ranging from 1 to the message length. For example, consider a tweet {"# SuperSunscreen is really useful, and I like its smell"}. After removing stop words and performing stemming, we have {"supersunscreen really useful like smell"}. The corresponding 1-grams are {"supersunscreen", "really", "useful", "like", "smell"}, and the corresponding 2-grams are {"supersunscreen really", "really useful", "useful like", "like smell"}. We let $N_i$ denote the T-gram of tweet corpus for each user i∈[1, n] for all possible values of T. Then we choose the top m most frequent T-gram in $\bigcup_{1 \leq i \leq n} N_i$, each of which is referred to as a keyword hereafter.

Finally, we use Term Frequency Inverse Document Frequency (TF-IDF) to derive each element $D_{i,j}$ in the eventual dataset. Specifically, let $\Gamma(j)$ be the number of times a T-gram j appears in the T-gram list $N_i$ of user i, $\Gamma^*_i = \max_{j \in N_i} \Gamma(j)$, and $\Gamma'(j)$ be the number of users whose T-gram lists contain j. We define:

$$D_{i,j} = \left(0.5 + 0.5 * \frac{\Gamma(j)}{\Gamma^*_i}\right) * \log\left(\frac{n}{\Gamma'(j)}\right).$$

The above normalization is necessary because the users normally have very different tweet sets and thus different T-gram lists. We abuse the notation by letting D=[$D_{i,j}$]∈ $\mathbb{R}^{n \times m}$ denote the dataset after text modeling as well, which is essentially an n×m user-keyword matrix. We also let $U_i$:= $\langle D_{i,1}, \ldots, D_{t,m} \rangle$ denote the text vector of user I (i∈[1,n]), the ith row in $\mathcal{D}$.

It is a common practice to use 1-grams and 2-grams only for high computational efficiency without significantly sacrificing the analysis accuracy. So the keyword space and user-keyword matrix can be constructed very quickly in practice. Also note that the DSP needs to outsource the T-gram name of each column. Otherwise, the data consumer has no idea about the physical meaning of the released data.

The text model above has two important implications. First, it makes the unstructured social media data structured by reducing the keyword dimension from unlimited to m. Second, since the keyword space is composed of the top m most frequent T-gram, the users' privacy has been largely improved in contrast to the original unperturbed text data. For example, when a user has a tweet saying "The last class with students at CSE561, # MIT", the word "CSE561" or even "MIT" has very low probability to be selected in the keyword space. Therefore, this critical information has been hidden by the text modeling process. The privacy threat, however, cannot be completely eliminated.

For instance, the 1-grams such as "last", "class", and "student" may still be released. These pieces of information can at least tell that the user is a professor or teacher. By combining other text information such as "computer" and "software," the attacker can further link the target user to a college professor teaching computer science. Such inferences can be continued until the target is linked to one or a few real IDs on the social media platform.

Differential privacy is a powerful technique to protect such linkage attacks. Differential privacy protects the individual user's privacy during the statistical query over a database. If each user in the database is independent, without any side information except the target him/herself, the attacker cannot infer whether the target user is in the database or which record is associated with him/her. Providing arguably the strongest analytical protection for user privacy, the differential privacy model can be more formally defined as follows, which is tailored for the disclosed social media data outsourcing framework.

Definition 1—$\epsilon$-differential Privacy: Given a query function $f(\mathcal{D})$ with an input dataset $\mathcal{D} \in \mathbb{R}^{n \times m}$ and a desirable output range, a mechanism $K(\cdot)$ with an output range R satisfies $\epsilon$-differential iff:

$$\frac{Pr[K(f(D_1)) = R \in \mathcal{R}]}{Pr[K(f(D_2)) = R \in \mathcal{R}]} \leq e^{\epsilon}$$

for any datasets $D_1, D_2 \in \mathbb{R}^{n \times m}$ that differ on only one row.

Here $\epsilon$ is the privacy budget. Large $\epsilon$ (e.g. 10) results in large $e^{\epsilon}$ and indicates that the DSP can tolerate large output difference and hence large privacy loss (because the adversary can infer the change of the database according to the large change of the query function f(·). By comparison, small $\epsilon$ (e.g., 0.1, e0.1=1.1052) indicates that the DSP can tolerate small privacy loss.

Differential privacy models can be interactive and non-interactive. Assume that the data consumer intends to execute a number of statistical queries on the same dataset. In the interactive model, the data consumer submits to the DSP the conditions for constructing the dataset D and also a desirable statistical query function $f$. Instead of returning D to the user, the DSP only responds with $K(f(\mathcal{D}))$, where $K(\cdot)$ perturbs the query result. In contrast, the DSP in the non-interactive model designs a mechanism $K(\cdot)$ to transform the original dataset D into a new dataset $\mathcal{D}'=K(f(\mathcal{D}))$. Finally, D' is returned to the data consumer which can execute arbitrary statistical queries locally.

Use of $\epsilon$-text indistinguishability: The problem can be formulated according to a non-interactive differential privacy model as follows. Let us use an identity query $f_I(\cdot)$ as the query function such that $f(\mathcal{D})=\mathcal{D}$. The goal is to find a mechanism KO to transform the original user-keyword matrix (or dataset) D into a new one D'=K(D) such that $\epsilon$-differential privacy can be achieved. Instead of transforming the entire dataset D as a whole, a more straightforward approach is to perform the transformation for each row individually, i.e., adding noise to each row $U_i \in \mathcal{D}$ to produce a new row $U'_i \in \mathcal{D}'$.

The dimensionality problem: While the Laplacian mechanism is a popular technique for providing $\epsilon$-differential privacy, it suffers from the curse of dimensionality. To see it more clearly, recall that $\epsilon$-differential privacy is defined over the query function f and unrelated to the dataset because $$\frac{Pr[K(f(D_1)) = R \in \mathcal{R}]}{Pr[K(f(D_2)) = R \in \mathcal{R}]} \leq e^{\epsilon}$$

holds for all possible datasets. What matters is the maximum difference of $f(D_1)$ and $f(D_2)$ ($\forall D_1, D_2 \in \mathbb{R}^{n \times m}$), which is called the sensitivity of the query function f defined as $S(f) = \max \|f(D_1) - f(D_2)\|_1$.

As identity query $f_I(\cdot)$ transforms each text vector in D to a new vector in D', the sensitivity can be further defined as $S(f_I) = \max \|U_i - U_j\|_1$, where $U_i \in \mathbb{R}^m$ and $U_j \in \mathbb{R}^m$ are any two arbitrary vectors based on TF-IDF.

The Laplacian mechanism can achieve $\epsilon$-differential privacy by adding the Laplacian noise to the query result, such as: $K_{Lp}(f_I(U_i)) = U_i + (Y_{i1}, \ldots, Y_{im})$, i=1, . . . , n, where $Y_{ij}$ are drawn i.i.d. from $\text{Lap}(S(f_I)/\epsilon\_ \propto e^{-\epsilon |x|/S(f_I)}$.

The Laplacian mechanism unfortunately decreases the utility of the transformed dataset. Specifically, the larger the dimension m from the output of the identity query function $f_I(\cdot)$, the larger the sensitivity $S(f_I)$, the larger deviation of the Laplacian noise. Moreover, the large noise accumulated from the high dimension will be added to each single element of $K_{Lp}(f_I(U))$, leading to the so-called curse of dimensionality. Specifically, from the definition of the text vector $U_i$ from above, the norm of each element in $U_i$ should be less than $\log(n)(\approx 11.5$ when n=100000). When the dimension m (e.g., 10000) is large enough, the added Laplacian noise has deviation O(m), which can easily exceed the norm of original text element ($\approx 11.5$).

Indistinguishability of $\epsilon$-text: The root cause of the curse of dimensionality is that the noise added to a single element in every text vector $U_i(\forall i \in [1, n])$ is proportional with the $L_1$-sensitivity of $U_i$. To tackle this problem, we need to limit the sensitivity of the whole text vector to the norm of the vector, instead of the individual element.

To begin with, we need to generalize the concept of differential privacy defined in Definition 1 above. The generalization of differential privacy is defined for location privacy where the privacy budget is proportional to the physical distance between any two users in conjunction with the concept of geo-indistinguishability such that the service provider reports similar distribution with the difference bounded by $e^{\epsilon d(loc_1, loc_2)}$ for any two users at locations $loc_1$ and $loc_2$, respectively. Inspired by this work, we let $d(U_i, U_j)$ denote the Euclidean distance between $U_i$ and $U_j$, which are any pair of text vectors in the user-keyword matrix D. We further redefine the privacy budget as $\epsilon d(U_i, U_j)$ and propose the notion of $\epsilon$-text indistinguishability.

Definition 2—$\epsilon$-text indistinguishability: Given the user-keyword matrix $\mathcal{D} = [D_{i,j}] \in \mathbb{R}^{n \times m}$, a mechanism $Kt(\cdot)$ satisfies $\epsilon$-text indistinguishability iff.

$$\frac{Pr[K_t(U_i) = U^* \in \mathbb{R}^m \mid U_i]}{Pr[K_t(U_j) = U^* \in \mathbb{R}^m \mid U_j]} \leq e^{\epsilon d(U_i, U_j)},$$

where $U_i$ and $U_j$ are any user text vector pair in D, and $U^*$ is a text vector in perturbed user-keyword matrix D'.

The above definition means that any two vectors $U_i$ and $U_j$ in D can be transformed (or perturbed) by the mechanism $Kt(\cdot)$ into the same vector in D' with probability$\geq e^{-\epsilon d(U_i, U_j)}$. In other words, the more similar two text vectors are, the more non-distinguishable they are after transformation, and vice versa. The maximum privacy budget is given by $\epsilon r^{max}$ where $r_{max}$ denotes the maximum Euclidean distance between two text vectors in D. As in the original $\epsilon$-differential privacy mechanism, the larger the privacy budget, the larger the privacy loss the DSP can tolerate, and vice versa. Theorem 1 gives the upper bound of $\epsilon r_{max}$, based on which the DSP can select E to ensure an acceptable privacy budget.

Theorem 1: Given the user-keyword matrix $\mathcal{D} \in \mathbb{R}^{n \times m}$ built according the equation $$D_{i,j} = \left(0.5 + 0.5 * \frac{\Gamma(j)}{\Gamma_i^*}\right) * \log\left(\frac{n}{\Gamma'(j)}\right),$$

the maximum Euclidean distance between two text vectors is $T_{max} \leq \sqrt{m}\log(n)$.

Proof. According to the definition in the above equation, a text vector U has the maximum norm $\sqrt{m}\log(n)$ when each of its element is equal to the maximum value log(n). It follows that $$r_{max} \leq \|U_1 - U_2\| \leq \|U\| \leq \sqrt{m}\log(n).$$

The upper bound above is almost unreachable in practice, as it requires that all the m keywords be used by only one user. So $r_{max}$ is far less than $\sqrt{m}\log(n)$. But if the DSP chooses ϵ according to $\sqrt{m}\log(n)$, the effective privacy budget for many text-vector pairs is very small, implying that these text-vector pairs are very likely to be indistinguishable after perturbation.

Achieving ϵ-text Indistinguishability: In this section, we propose a mechanism to achieve the ϵ-text indistinguishability. To this end, we first assume $r_{max}$ to be infinite and then finite. 1) Mechanism for Infinite $r_{max}$: The mechanism $K_r(f_I(\cdot))$, designed for the identity query $f_I(\cdot)$, maps each text vector $u \in \mathbb{R}^m$, of the dataset D to a new U' with the same dimension m. To that end, we write the perturbed U' as:

$$U' = U + d\Theta$$

where d is a random variable indicating the Euclidean distance between U and U', and Θ is an m-dimensional random vector drawn from the m-dimensional unit hypersphere. The mechanism is then composed of two steps: the generation of the magnitude and the direction. Since the drawing of Θ is straightforward, we focus on generating d. Similar to the Laplacian mechanism, we let d deviate from the center U by the Laplacian distribution, $g(d) = \epsilon e^{-\epsilon d}$, where d ranges from zero to infinity. It is easy to check that $\int_0^{+\infty} g(d) = 1$.

The CDF of d is given by $$C_\epsilon(D < \times r) = \int_0^r \epsilon e^{-\epsilon x} dx = 1 - e - \epsilon r.$$

The CDF above tells us how to generate a random d. Specifically, given a user text vector U, we want to generate a perturbed vector which has at most d Euclidean distance from U. Since d follows the CDF defined in the equation $$C_\epsilon(D < \times r) = \int_0^r \epsilon e^{-\epsilon x} dx = 1 - e - \epsilon r.$$

given a random probability $p \in [0, 1]$, we can obtain $$d = C_\epsilon^{-1}(p) = -\frac{\log(1-p)}{\epsilon}.$$

We now show that the proposed mechanism satisfies ϵ-text indistinguishability.

Theorem 2: The mechanism $K_r(f_I(\cdot))$ defined above achieves the ϵ-text indistinguishability.

Proof. Given two user text vectors $U_i$ and $U_j$, the probability quotient of being perturbed to the same vector U* is $$\frac{Pr[U = U^* | U_i]}{Pr[U = U^* | U_j]} = \frac{Pr[d(U^*, U_i)]\Theta_1}{Pr[d(U^*, U_j)]\Theta_2}$$

$$= e^{\epsilon(d(U^*, U_i) - d(U^*, U_j))} \leq e^{\epsilon(d(U_i, U_j))}.$$

Figure 3:
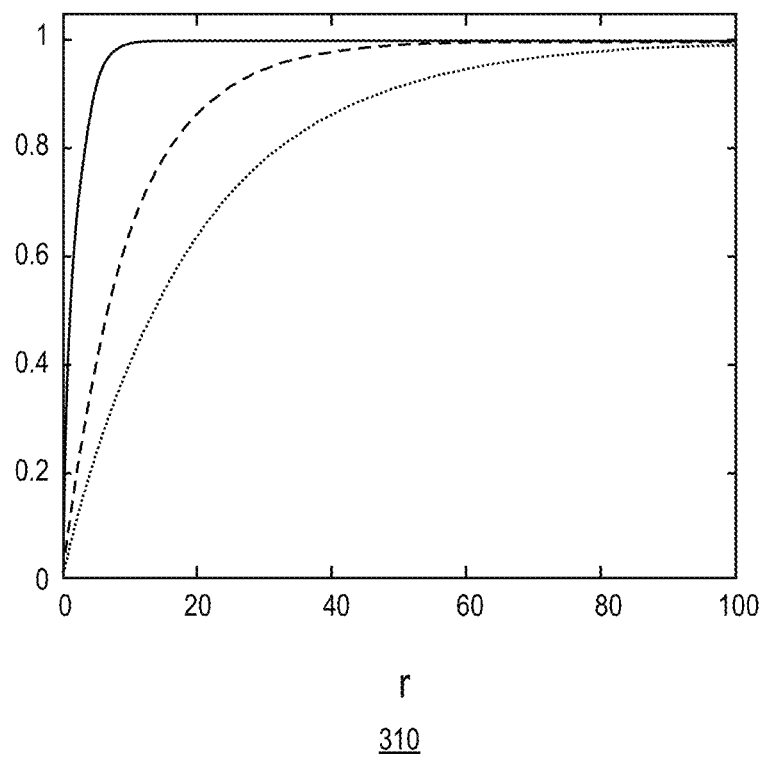
FIG. 3 depicts an exemplary Cumulative Distribution Function (CDF) and variables, in accordance with described embodiments.

FIG. 3 depicts an exemplary Cumulative Distribution Function (CDF) and variables in accordance with described embodiments.

FIG. 3 provides $C_\epsilon(d=r)$ 300, which is CDF 305 as a function of varying privacy budgets ϵ 315, 316 and 317 for Euclidean distance d equal to r 310, the distance between two text vectors.

Figure 4:
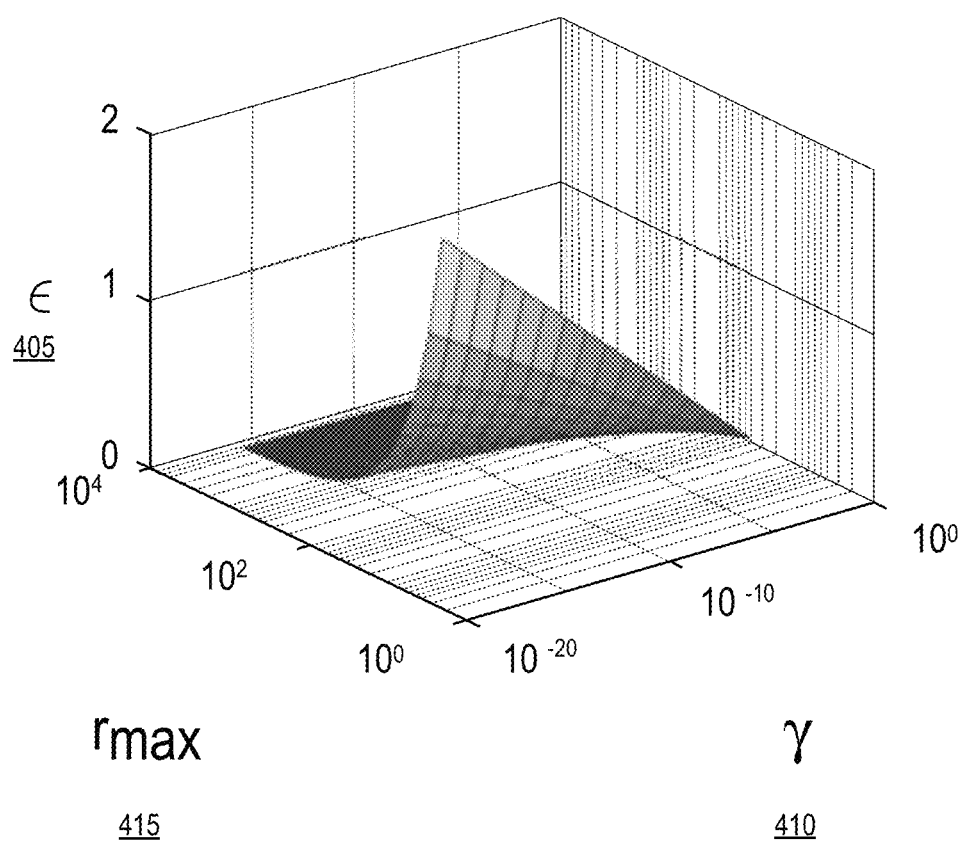
FIG. 4 depicts another exemplary Cumulative Distribution Function (CDF) given tolerance parameter γ 410, in accordance with described embodiments.

FIG. 4 depicts exemplary Cumulative Distribution Function (CDF) given tolerance parameter γ 410; using the maximum distance between two text vectors $r_{max}$ 415 to determine privacy budget ϵ 405 by tolerance parameter γ 410.

Here d $\Theta_1$ and $\Theta_2$ can be canceled because both are drawn from the m-dimensional unit hypersphere with the same probability, and the inequity holds because of the triangle inequity.

2) Mechanism for Limited $r_{max}$: The mechanism $K_r(f_I(\cdot))$ in the last section maps the user text vector U to U' with potentially infinite distance. However, we have demonstrated in Theorem 1 that any text vector pair have the Euclidean distance bounded by $r_{max}$. Here we present how to truncate the mapping into a specific $r_{max}$. We denote the corresponding mechanism as $K_r(f_I(\cdot))$.

As we can see from FIG. 3, $C_\epsilon(d=r)$ 300 approaches 1 most quickly when r 310 is below 20. At a higher ϵ=0.80 315, $C_\epsilon(d=r)$ 300 reaches 1 around r310=10. At lower ϵ=0.1 316, $C_\epsilon(d=r)$ 300 reaches 1 around r 310=60. Finally, at lowest ϵ=0.08 317, $C_\epsilon(d=r)$ 300 reaches 1 around r 310=100. Therefore, a higher ϵ and lower r 310 optimizes the maximum value of CDF 305 reaching 1.

Therefore, we define a tolerance parameter γ 410 to indicate how much of CDF will be outside $r_{max}$ 415. In other words, $$1 - \gamma = C_\epsilon(d <= r_{max}) = 1 - e^{-\epsilon r_{max}} \Rightarrow \epsilon = -\frac{\log(\gamma)}{r_{max}}.$$

FIG. 5 depicts a perturbation algorithm $K_r(f_I(\cdot))$, in accordance with described embodiments. For instance, given the tolerance parameter γ and $r_{max}$, line 1 computes the ϵ by the equation $$1 - \gamma = C_\epsilon(d <= r_{max}) = 1 - e^{-\epsilon r_{max}} \Rightarrow \epsilon = -\frac{\log(\gamma)}{r_{max}}.$$

Then for each $U_i$ in the dataset D, we draw the noise vector dΘ by two steps: (1) obtain the magnitude of the radius d in Line 3 by $r = C_\epsilon^{-1}(p)$, and (2) compute the direction Θ in Line 4 by drawing a random vector from the unit m-dimensional hypersphere. Line 5 adds the noise $U_i$ to get $U_i'$.

We also show that the mechanism $K_r(f_I(\cdot))$ achieves the ϵ-text indistinguishability.

Theorem 3. The mechanism $K_r(f_I(\cdot))$ defined above achieves the ϵ-text indistinguishability within $r_{max}$.

Proof. For each text vector U, with the probability of 1−γ, the perturbed text vector U0 has the Euclidean distance less or equal to $r_{max}$ from U. The rest steps follow the proof of Theorem 2, and the conclusion holds.

Performance Analysis:

1) Privacy budget: As shown in the equation $$1 - \gamma = C_\epsilon(d <= r_{max}) = 1 - e^{-\epsilon r_{max}} \Rightarrow \epsilon = -\frac{\log(\gamma)}{r_{max}},$$

the constant scale of the privacy budget $\epsilon d$, can be determined by $\gamma$ 410 and $r_{max}$ 415, as shown in FIG. 4. As we can see, for an $r_{max}$ 415 ranging from $10^0=1$ to $10^4$ and $\gamma$ 410 ranging from $10^0=1$ to $10^{16}$, $\epsilon$ 405 is always less than 2.

Moreover, since $\epsilon$ i is reversely proportional to $r_{max}$, the whole privacy budget $\epsilon d$, is less than $-\log(\gamma)$ (because $d \le r_{max}$), which is relatively small. The small privacy budget is critical for differential privacy mechanisms because a large budget results in a large privacy loss.

2) Breaking the so-called "Curse of Dimensionality:" As stated above, the original $\epsilon$-differential privacy notion and the corresponding Laplacian mechanism suffer from the curse of dimensionality. The reason is that the noise strength added to each element in the text vector has a scale of $S(f_I)/\epsilon$, where $S(f_I)$ is the $L_1$ sensitivity of the text vector and proportional to the dimension m. We now estimate the scale of the noise strength for the mechanism $K_r(f_I(\cdot))$.

Theorem 4. Given a text vector $U \in \mathbb{R}^m$, by applying the mechanism $K_r(f_I(\cdot))$, the expected noise strength for each element in U is unrelated to the dimension m.

Moreover, by setting $\gamma$ to an extremely small value (e.g., $10^{-16}$), the upper bound approaches 1. Note that according to Theorem 1, this upper bound is rather loose. Therefore, the expected noise strength for each element is far less.

Usefulness of ($\alpha$, $\delta$): An $\epsilon$-text indistinguishability mechanism K satisfies ($\alpha$, $\delta$)-usefulness if for every user text vector U, with the probability at least $\delta$, the perturbed text vector U' satisfies $d \le \alpha$.

Theorem 5. The mechanism $K_r(f_I(\cdot))$ defined above achieves the ($\alpha$, $\delta$)-usefulness.

Proof. It can be easily seen from the CDF of d in the equation $$C_\epsilon(d<=r)=\int_0^r \epsilon e^{-\epsilon x} dx = 1-e-\epsilon r.$$

Figure 6:
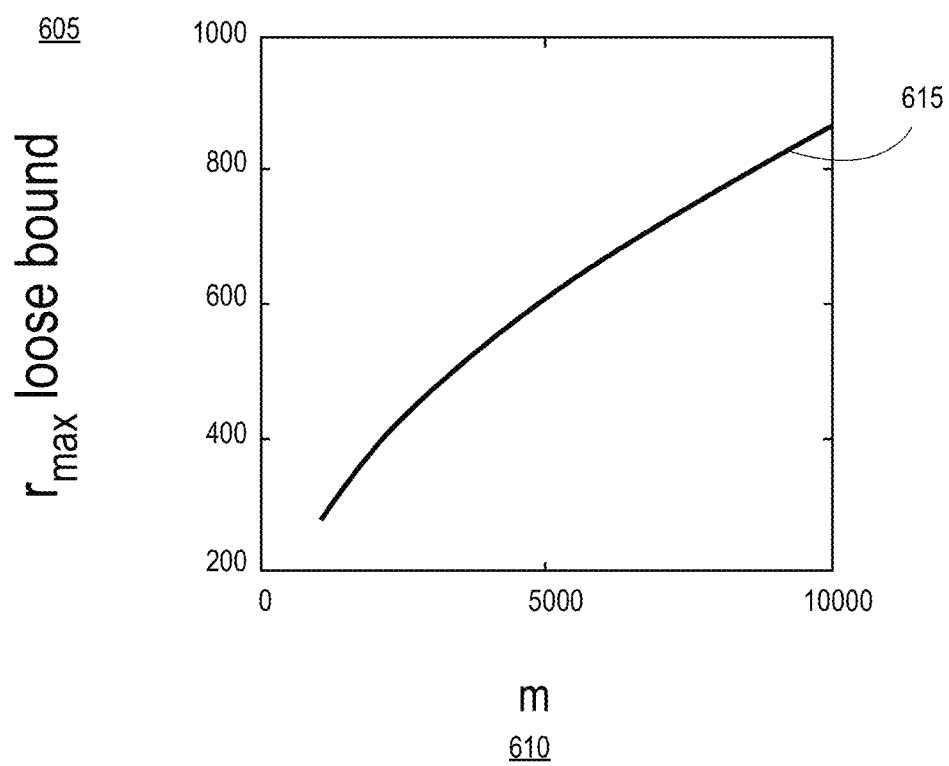
FIG. 6 depicts experimental data from implementation of the described embodiments, with the loose upper bound of $r_{max}$, in accordance with described embodiments.

FIG. 6 depicts experimental data from implementation of the described embodiments, with the loose upper bound of $r_{max}$ 605 as a function 615 of dimension m 610. Here, the loose upper bound of $r_{max}$ 605 increases sublinearly according to function 615 as dimension m 610 increases.

Figure 7A:
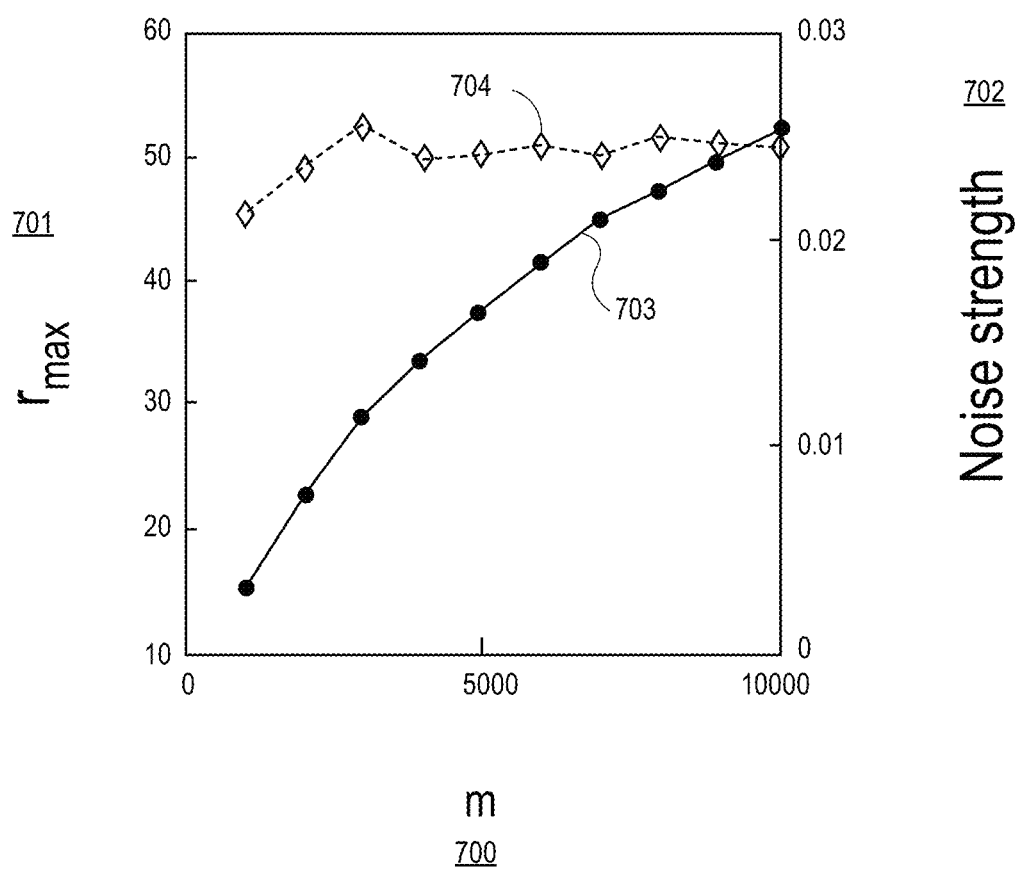
FIG. 7A depicts additional experimental data from implementation of the described embodiments, where the real $r_{max}$ and the noise strength for each element are depicted, in accordance with described embodiments.

FIG. 7A depicts additional experimental data from implementation of the described embodiments, where the real $r_{max}$ 701 and the noise strength 702 for each element are depicted as functions 703 and 704 of dimension m 700. Here, function 703 increases with increasing dimension m 700, reaching $r_{max}$ 701=50 and noise strength 702=0.025, when dimension m 700=10,000. In contrast, function 704 remains relatively stable around $r_{max}$ 701=50 and noise strength 702=0.025 as dimension m 700 increases.

FIGS. 7B and 7C depict further experimental data from implementation of the described embodiments, specifically showing the usefulness of the mechanism.

Evaluation:

In this section, we use both a real-world dataset and simulations to evaluate the proposed $\epsilon$-text indistinguishability mechanism $K_r(f_I(\cdot))$ in three aspects: the privacy and usefulness, the utility on a typical ML task, and the defense against user-linkage attacks.

Dataset: As stated before, the data consumer aims to use the social media data for demographical analysis. Here we use a ground-truth Twitter user dataset with known age information. Specifically, a user A has age x if one of his friends has posted a tweet with the format "Happy $x^{st/nd/rd/th}$-birthday to A". We used Twitter Streaming API to monitor these tweets and the ground-truth users. We then manually check the consistency between the claimed age information and the tweets they have posted to. Finally, we found 5,710 users, which consist of 2,855 users who are at least and less than 25 years old, respectively. We crawled one year of their recent tweets and obtained 3,363,706 tweets. We then removed the stopping words and conducted the stemming as stated above and built the TF-IDF matrix for the following experiments according to the equation $$D_{i,j} = \left(0.5 + 0.5 * \frac{\Gamma(j)}{\Gamma_i^*}\right) * \log\left(\frac{n}{\Gamma'(j)}\right).$$

Because of the randomness during the noise generation, we run each of the experiment 100 times and report the average results.

Privacy and Usefulness: We first check $r_{max}$ in the real-world dataset above. FIG. 6 shows the loose upper bound of $r_{max}$ 605 with different dimension m 610 stated in Theorem 1. We set the number of users n=5710. The upper bound is a sublinear function with m 610, and increases from 250 to 850 when m 610 ranges from 1000 to 10000.

We also measure $r_{max}$ in the dataset. Specifically, we compute $r_{max}$ as the maximum $L_2$ norm of each row vector from the dataset D. As we can see in FIG. 6, although the loose upper bound of $r_{max}$ 605 increases sublinearly with m 610, it is much less than the loose upper bound 605 maximum value=1000. The reason is twofold. First, as we built the TF-IDF dataset by choosing the most m frequent grams, the IDF term in the equation $$D_{i,j} = \left(0.5 + 0.5 * \frac{\Gamma(j)}{\Gamma_i^*}\right) * \log\left(\frac{n}{\Gamma'(j)}\right),$$

is much less than log(n). Second, the TF part is less than $\sqrt{m}$ as the text vector is sparse (each user has only used limited grams when m is large).

Given $r_{max}$ 701, FIG. 7A demonstrates that the expected noise strength 702 added for each single element in the text vector is fairly stable with the dimension m 700, which is consistent with Theorem 4. Moreover, the expected noise strength 702 ranges approximately between 0.02 and 0.03, and is comparable to the original data. Therefore, the proposed mechanism can tolerate an arbitrary dimension, i.e., breaking the curse of dimensionality.

FIGS. 7B and 7C show the 716, 705 of the mechanism at different $r_{max}$ 710, 711, 712 and $\gamma$ 713, 714 and 715, respectively. As we can see, with probability $\delta$ 705 the distance of the original 710, 713 and perturbed 711, 712, 714 and 715 text vectors are within a 716, which verifies Theorem 5.

In FIG. 7B, increasing $r_{max}$ from 50 to 100 to 150 shifts text vectors 710, 711 and 712 further and further to the right, shown here as (b) $r_{max}$=100 at element 721. This also occurs in FIG. 7C when $\gamma$ is increased from $10^{-16}$ to $10^{-8}$ to $10^{-4}$, demonstrated by text vectors 713, 714 and 715, respectively, but the rightward shifts are on a smaller magnitude of scale. The rightward shift from perturbed text 714 to perturbed text vector 715 when γ is increased from $10^{-8}$ to $10^{-4}$ is also a much smaller shift than the shift from original text vector 713 to perturbed text vector 714 when γ is increased from $10^{-16}$ to $10^{-8}$, shown here as (a) γ=$10^{-8}$ at element 720.

Performance on Classification: We evaluate the mechanism on classification, one of the typical applications from the machine learning community. As stated before, each user has the ground-truth age information. We can then build a binary classifier to determine whether a user is younger than 25 years old or not. We use the SVM algorithm to evaluate the performance on both the original and the perturbed datasets by ten-fold cross validation.

FIGS. 8A, 8B, 8C, and 8D depict the performance of the classification in accordance with described embodiments.

Figure 8A:
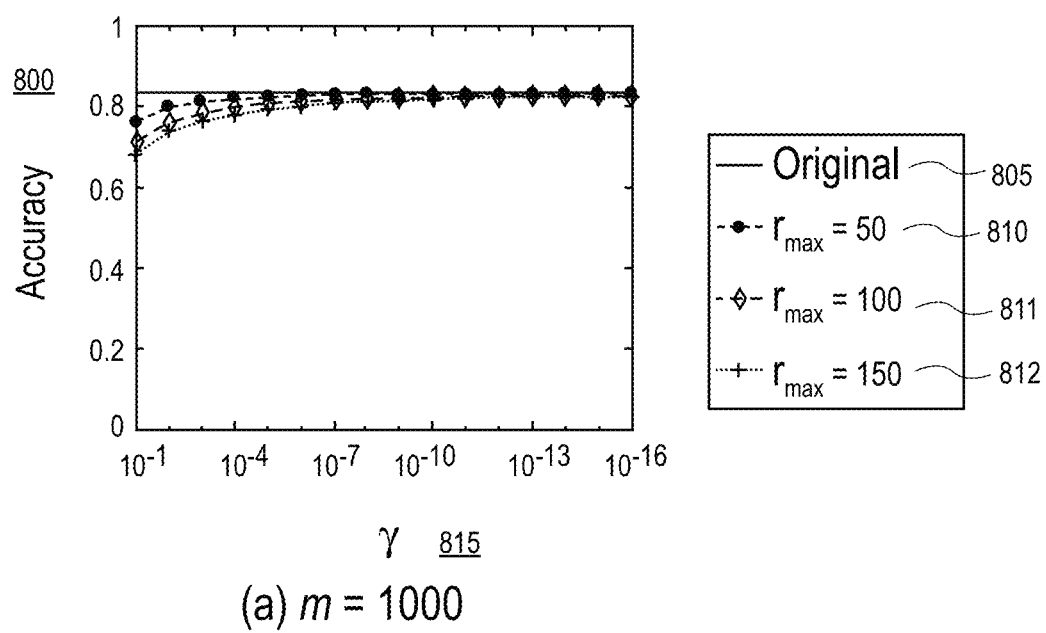
FIGS. 8A, 8B, 8C, and 8D depict the performance of the classification and its accuracy, in accordance with described embodiments.

FIG. 8A demonstrates the classification accuracy 800 with γ 815 form 819=1000. Shown are original dataset 805 and perturbed datasets 810, 811 and 812 with $r_{max}$ 50, 100 and 150, respectively. As we can see, the smaller γ 815, the higher the performance (accuracy) 800 for the perturbation mechanism. This result is expected as Theorem 4 indicates that the smaller γ, the less the noise added to the original dataset. However, small γ 410 will increase the privacy budget scale ϵ 405 and hence the privacy loss.

Figure 8B:
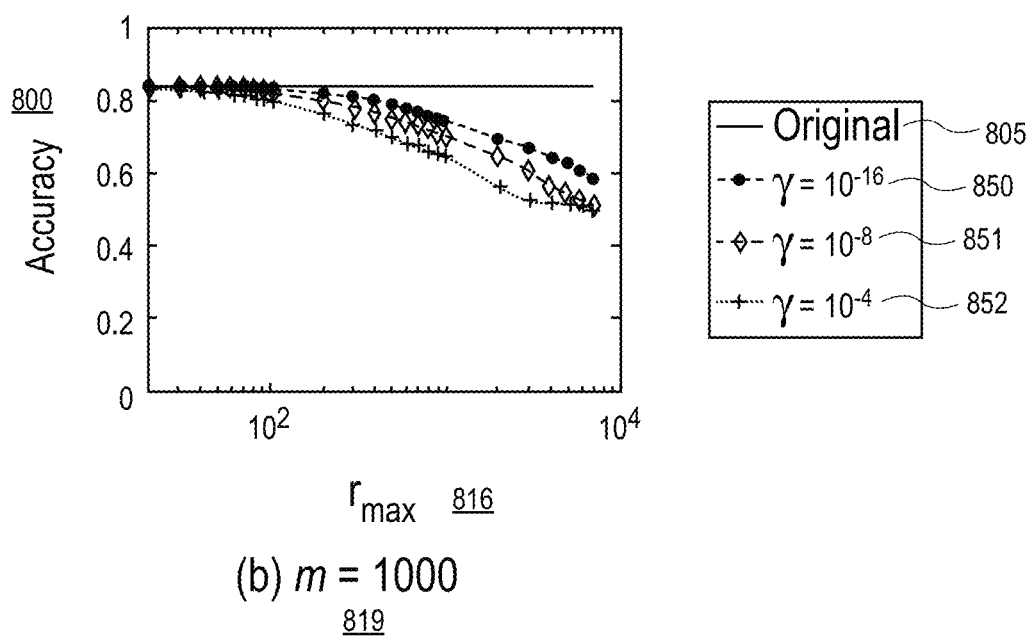

FIG. 8B demonstrates the accuracy of the original dataset 805 and the perturbed datasets 850, 851 and 852 with γ=$10^{-16}$, $10^{-8}$ and $10^{-4}$, respectively when m 819=1000. The perturbed datasets 850, 851 and 852 have a faster rate of decline in accuracy 800 than original dataset 805 as $r_{max}$ 816 increases. Also shown here is that the smaller $r_{max}$ 816, the better the accuracy 800 because smaller $r_{max}$ 816 will incur less noise. However, less noise will cause a high privacy loss because the attacker can infer the victim given the huge difference between the two perturbed vectors.

Figure 8C:
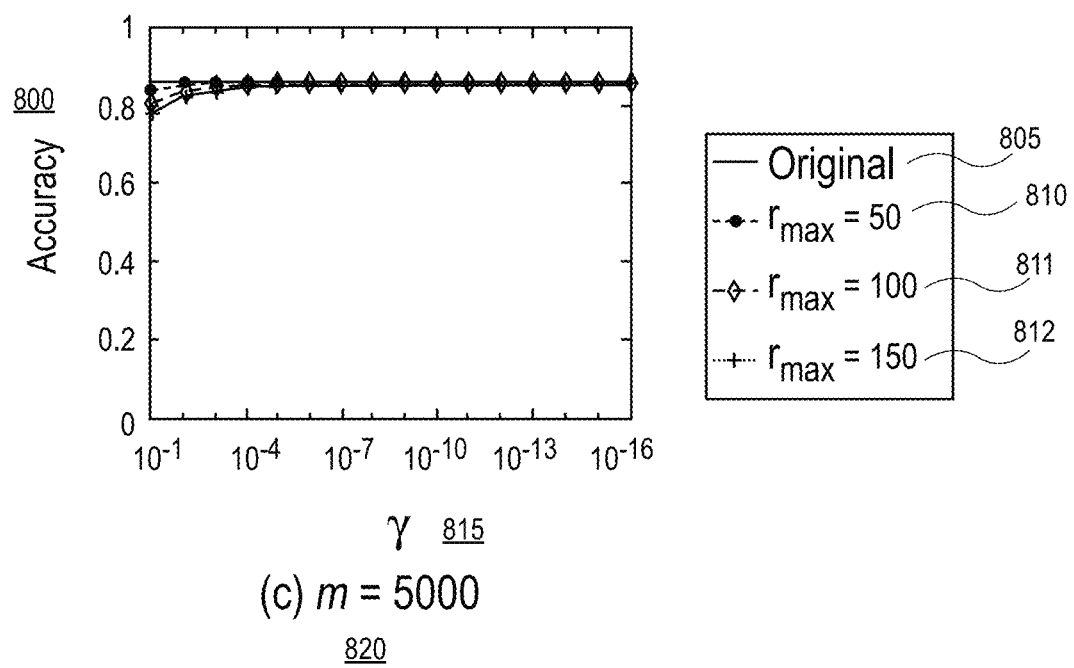
Figure 8D:
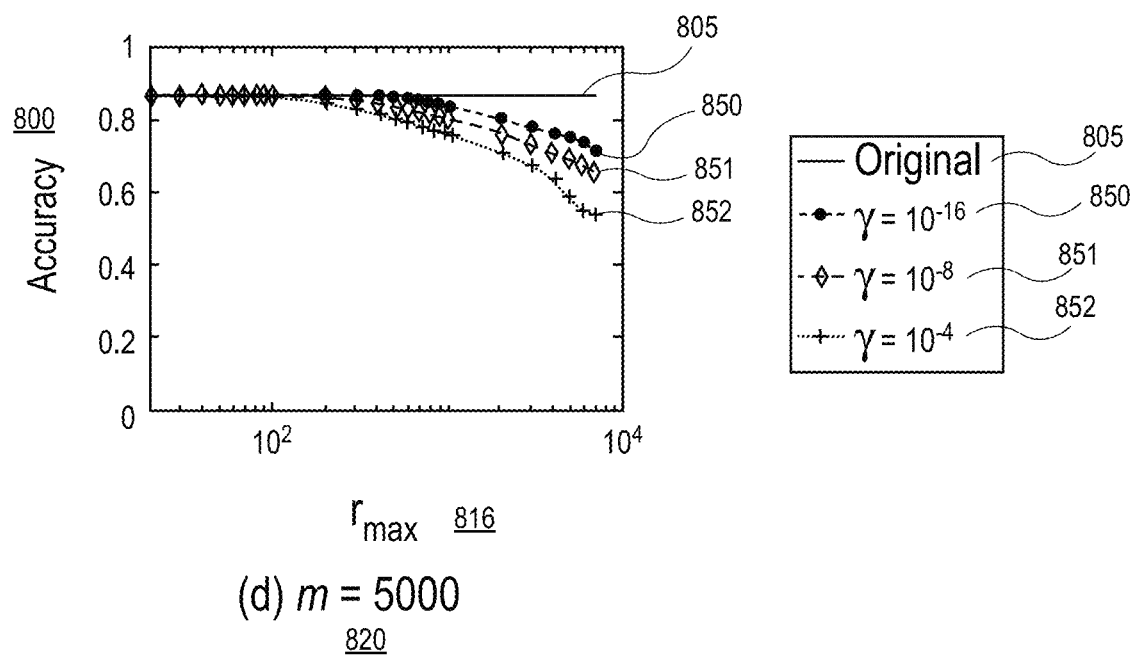

FIG. 8C and FIG. 8D show the accuracy of the original dataset 805 and the perturbed datasets 810, 811 and 812 with γ 815 form 820=5000. As we can see, both figures show a similar trend as when m 819=1000, meaning that the mechanism m works well at various dimensions. Moreover, the performance when m 820=5000 is slightly better than that when m 819=1000. This is evidenced by comparing FIG. 8C to FIG. 8A and by comparing FIG. 8D to 8B. FIG. 8C shows a higher accuracy 800 starting points of 0.8 or higher for all datasets 805, 810, 811 and 812 when m 820=5000 compared to less than 0.8 in FIG. 8A when m 819=1000. Also in FIG. 8C, a peak accuracy 800 of around 0.85 is reached by all datasets around γ 815=$10^{-7}$, in contrast with FIG. 8A where a similar peak accuracy is not reached until around $10^{-16}$. Also depicted is a slower rate of decline in accuracy 800 for all datasets 805, 850, 851 and 852 in FIG. 8D when m 820=5000 compared to FIG. 8B when m 819=1000. The reason for better performance at dimension m 820=5000 compared to m 819=1000 is that more keywords lead to better classification.

Defense Against User-Linkage Attacks: Our mechanism is designed to defend against the user-linkage attack. The definition of ϵ-text indistinguishability in Definition 2 and the corresponding mechanism in the algorithm 1 above, show that any user can be perturbed to another text vector with certain probability. Therefore, the perturbation can make the user-linkage attack more difficult to conduct. To evaluate the effectiveness of our mechanism, we need to model the strength of the attacker in terms of user inference. We consider two attack models here.

In inference attack I, we assume that the attack knows t elements of the victim's text vector, and t vary from 0 to m. We then build an estimated vector U' by keeping these t elements and setting other unknown elements to zero, and check whether the estimated vector U' is in the K-nearest vector set in both the original D and the perturbed D'. It is expected that the larger the # of disclosed keywords (t), the stronger the attack, and thus the higher the inference rate, meaning the higher the success ratio of users being correctly identified in user-linkage attacks. We set m=1000 and γ=$10^{-8}$. This experiment was conducted 1000 times and reporting depicts the average.

FIGS. 9A, 9B, 9C, and 9D depict the performance of an inference attack I, in which the attacker has knowledge o at least part of a user's data (e.g., part of a user's text vector), in accordance with described embodiments.

FIGS. 9A, 9B, 9C, and 9D show the inference rate among the K=1 (1st-nearest) 925, 927 and K=10 (10th-nearest) 926, 928 vectors for $r_{max}$=100 at elements 925, 926 and with $r_{max}$=200 at elements 927, 928. We can make two observations. Firstly, all the four curves show that the perturbation makes the user linkage attack much more difficult. Moreover, when the number of disclosed keywords (t) 920 increases from 300 to 600, the inference rate increase quickly from 0 to 100% for the original dataset 905. The inference rate 915 then stays at approximate 100% when t is larger than 600. Therefore, even at a higher number of disclosed keywords (t) 920, the success of user-linkage attacks, or inference rate 915 is lower when the dataset is perturbed, compared to the unperturbed (original) dataset 905.

Secondly, FIGS. 9A-9D further demonstrate the tradeoff between the privacy and usefulness for $r_{max}$. For instance, on the one hand, the mechanism's inference rate for $r_{max}$=200 is less than the rate for $r_{max}$=100 because a larger $r_{max}$ results in larger noise and hence higher-level privacy protection. On the other hand, as indicated in FIG. 9A-9D, a larger $r_{max}$ 816 results in lower classification performance (inference rate) 915 for perturbed dataset 910. The tradeoff also holds for γ 810, 811, 812 and 815 in FIGS. 8A-8D, with a larger γ resulting in lower classification performance (accuracy) 800 for perturbed datasets 810, 811 and 812.

Moreover, users' privacy has not largely sacrificed utility. For example in FIG. 9B, as a typical setting, in condition (b) 926 when $r_{max}$=100 and γ=$10^{-8}$, the inference rate with # disclosed keywords (t)=600 and K=10 is 35.9%, and the classification accuracy 800 is reduced by only 1.61% according to FIG. 8A. Therefore, the mechanism can achieve high privacy with little utility loss.

Figure 9C:
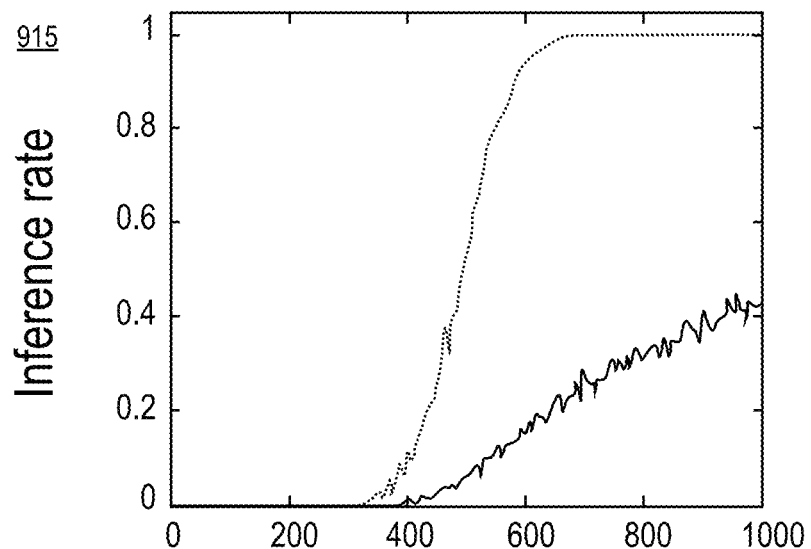

FIG. 9A shows the original dataset 905 and the perturbed dataset 910, where the inference rate 915 is a function of the number of disclosed keywords (t) 920 ranging from 0 to 1000. In FIG. 9A, condition (a) 925 sets K as the $1^{st}$-nearest vector set and the maximum distance between two text vectors $r_{max}$ at 100. As the number of disclosed keywords increases, the inference rate increases exponentially for both the original and perturbed datasets, reaching an inference rate 915 of 100% for original dataset 905 around a # of disclosed keywords (t) 920 of 600 and an inference rate 915 of approximately 65% around a # of disclosed keywords (t) 920 of 1,000 keywords for perturbed dataset 910. By comparison, the inference rate 915 for the perturbed dataset 910 is 68.8% for $r_{max}$=100 (K=10) under condition (b) 926 in FIG. 9B, around 40% for $r_{max}$=200 (K=1) under condition (c) 927 in FIG. 9C and 44.6% for $r_{max}$=200 (K=10) under condition (d) 928 in FIG. 9D. Therefore, the inference rate increases with a higher # of disclosed keywords (t) 920 as expected, and decreases at higher $r_{max}$, in which there is a greater maximum distance between two text vectors and lower K, when vector sets are nearer.

FIG. 9B involves the same datasets and axis variables, but condition (b) 926 sets K as the $10^{th}$-nearest vector. The original 905 and perturbed 910 dataset curves follow a similar trajectory as FIG. 9A. FIG. 9C continues with condition (c) 927 where K is again set as the $1^{st}$-nearest vector but $r_{max}$ is set at 200. The original dataset 905 remains relatively unchanged while the slope of the perturbed dataset curve decreases significantly, plateauing around an inference rate 915 of 0.4.

Figure 9D:
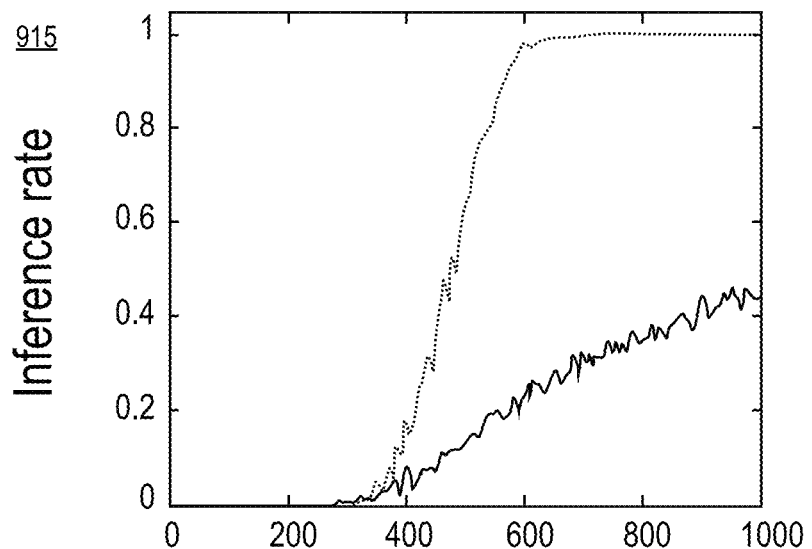
Figure 10A:
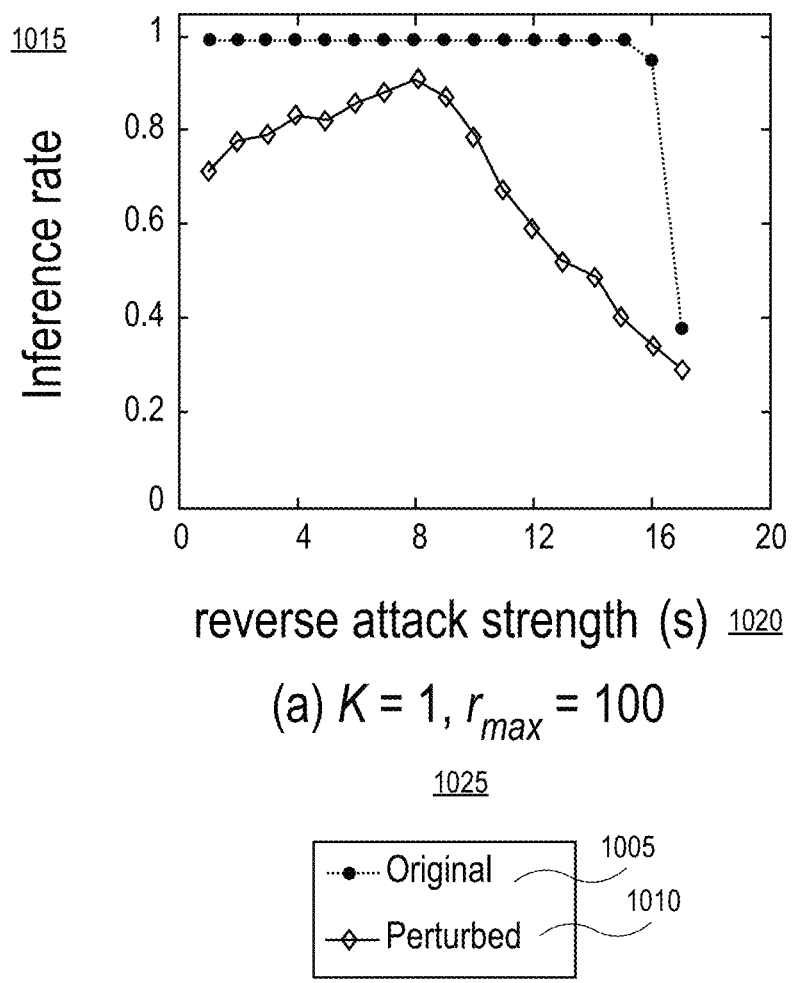
Figure 10B:
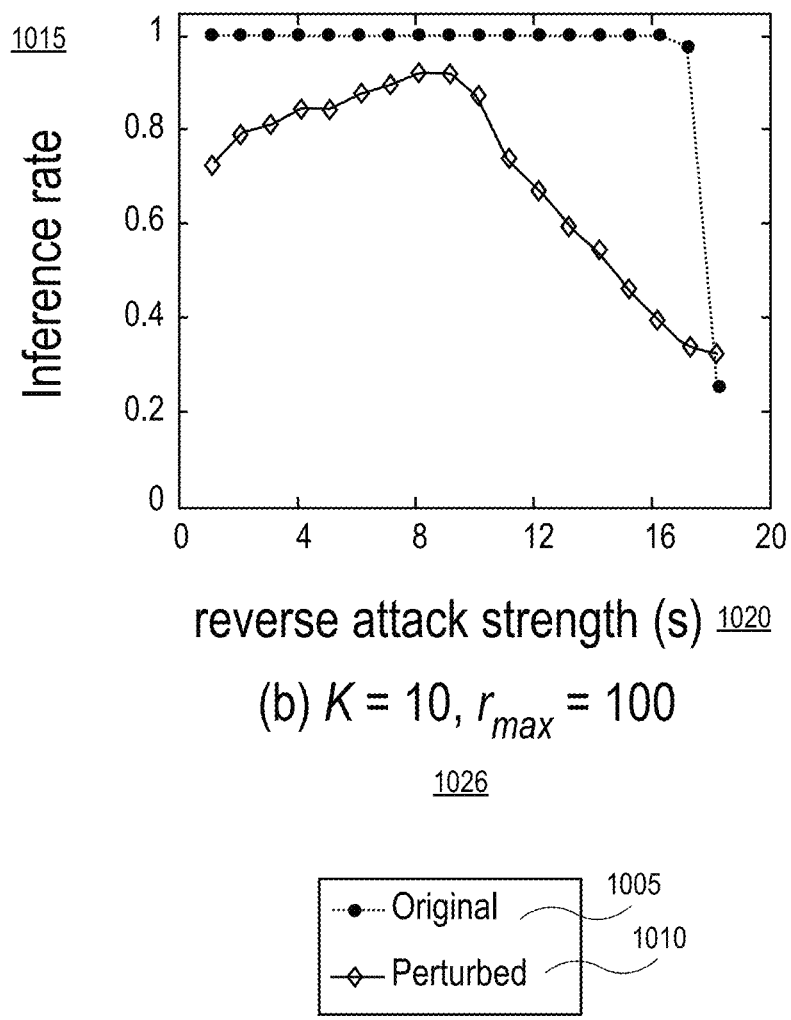
Figure 10C:
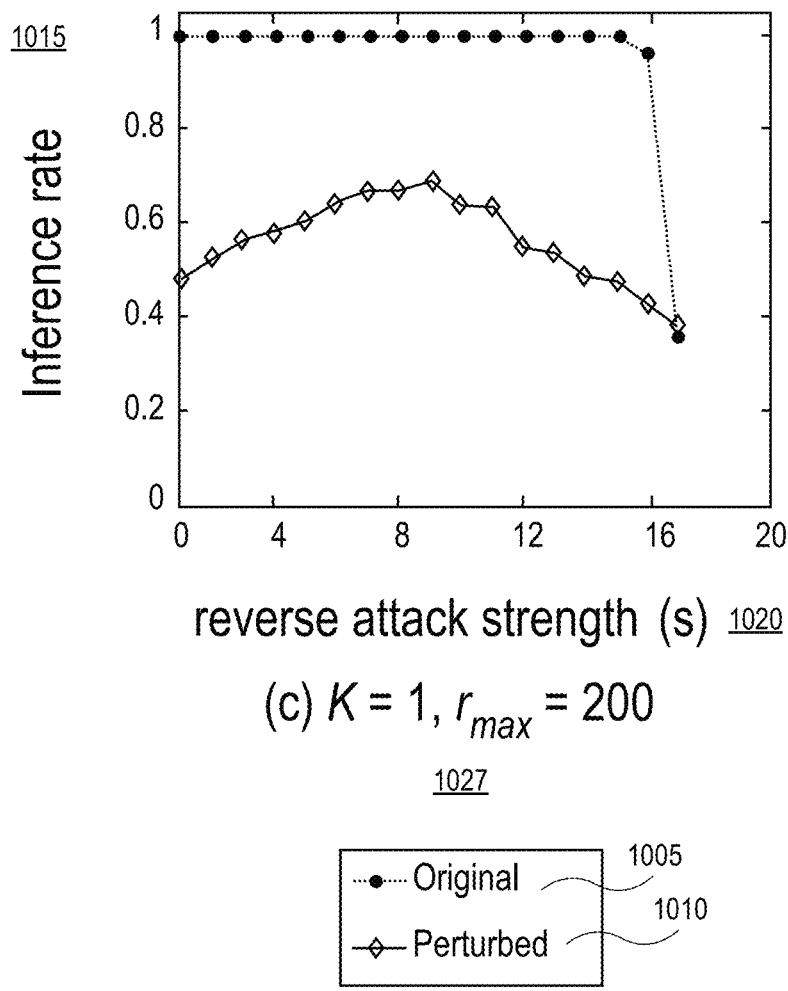

FIG. 9D involves condition (d) 928 which sets K as the $10^{th}$-nearest vector and keeps $r_{max}$ at 200. Both the original 905 and perturbed 910 datasets remain relatively unchanged from FIG. 9C. However, the slope of perturbed dataset 910 begins to rise earlier, at around 350 disclosed keywords (t) 920 instead of 400 disclosed keywords (t) 920.

FIGS. 10A, 10B, 10C, and 10D depict the performance of an inference attack II, in which an attacker knows more or potentially all of a user's data (e.g., a user's text vector), in accordance with described embodiments.

In inference attack II, we assume that the attacker knows the noisy but whole text vector of the victim. To that end, we randomly select a victim vector U* from D, add a noise vector N with the magnitude s where 1/s is the attack strength, and then check whether the noisy vector Ü=$U^s$+N is in the K-nearest vector set in both the original D and the perturbed D'. We use the Euclidean distance to represent the difference between any vector pair. It is expected that the weaker the attack strength, the higher the inference rate.

FIGS. 10A, 10B, 10C, and 10D show the inference rate among the K=1 (1st-nearest) vectors at elements 1025, 1027 and K=10 (10th-nearest) vectors at elements 1026, 1028 for $r_{max}$=100 at elements 1025, 1026 and $r_{max}$=200 at elements 1027, 1028.

Similar observations are now made as was done with regard to the inference attack I. Firstly, the perturbation algorithm makes the user linkage attack much more difficult. Consider reverse attack strength (s), which is the inverse of the attack strength (1/s). Specifically, when reverse attack strength (s) increases, the inference rate for the perturbed dataset decreases to about 30% for K=1 at elements 1025, 1027 and 40% for K=10 at elements 1026, 1028, meaning that the attacker has limited power to infer the victim. By comparison, the inference rate for the original dataset is always 100% when s is less than 17. The reason is that each user text vector is very distinguishable. When s>17, the inference rate for the original dataset 1005 decreases dramatically because the measured $r_{max}$ 701 for this dataset is 15.1 form 700=1000, as indicated in FIG. 7A.

Secondly, FIGS. 10A-10D and 8A-8D demonstrate the tradeoff between the privacy and usefulness in terms of $r_{max}$, and users' privacy has not largely sacrificed the utility. For example, according to FIG. 10B, as a typical setting (b) at element 1026, when $r_{max}$=100 and K=10 and reverse attack strength (s) 1020=15, the inference rate 1015 for the perturbed dataset 1010 is 47.7%, and according to FIG. 8A, the classification accuracy 800 is reduced by only 1.61%. The inference rate 1015 for the perturbed dataset 1010 declines when reverse attack strength (s) 1020 is approximately 10'.

Note that there is a peak point for the inference rate 1015 on perturbed dataset 1010 in FIGS. 10A, 10B, 10C and 10D. This is because that the perturbation also adds the noise vector in a similar way as in inference attack I. For different $r_{max}$, the perturbed vectors and have different Euclidean distance from the original vectors. Recall that U' and Ü are the perturbed vector and the estimated vector from the attacker for the victim U*, respectively. When the difference of d(U*, Ü) and d(U*, U') is small, the inference rate will increase. However, in reality, the attacker has little knowledge of the whole text vector for the victim, and it is difficult to conduct this type of inference.

FIG. 11 illustrates a diagrammatic representation of a machine 1100 in the exemplary form of a computer system, in accordance with one embodiment, within which a set of instructions, for causing the machine/computer system 1100 to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1118 (e.g., a persistent storage device including hard disk drives and a persistent database and/or a multi-tenant database implementation), which communicate with each other via a bus 1130. Main memory 1104 includes a Data Services Provider (DSP) framework 1124 and a data aggregator 1123 and a data privacy engine 1125 by which to receive, process, and inject controlled noise in furtherance of the embodiments as described herein. Main memory 1104 and its sub-elements are operable in conjunction with processing logic 1126 and processor 1102 to perform the methodologies discussed herein.

Processor 1102 represents one or more processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations and functionality which is discussed herein.

The computer system 1100 may further include a network interface card (NIC) 1108. The computer system 1100 also may include a user interface 1110 (such as a video display unit, a liquid crystal display, etc.), an alphanumeric input device 1112 (e.g., a keyboard), a cursor control device 1114

(e.g., a mouse), and a signal generation device 1116 (e.g., an integrated speaker). The computer system 1100 may further include peripheral device 1136 (e.g., wireless or wired communication devices, memory devices, storage devices, audio processing devices, video processing devices, etc.).

The secondary memory 1118 may include a non-transitory machine-readable storage medium or a non-transitory computer readable storage medium or a non-transitory machine-accessible storage medium 1131 on which is stored one or more sets of instructions (e.g., software 1122) embodying any one or more of the methodologies or functions described herein. The software 1122 may also reside, completely or at least partially, within the main memory 1104 and/or within the processor 1102 during execution thereof by the computer system 1100, the main memory 1104 and the processor 1102 also constituting machine-readable storage media. The software 1122 may further be transmitted or received over a network 1120 via the network interface card (NIC) 1108.

According to a particular embodiment, there is such a machine 11 which implements Data Services Provider (DSP) Framework system, including at least a memory 1104 to store instructions or processing logic 1126 and a processor 1102 to execute instructions or processing logic 1126 stored within the main memory 1104. Such a machine further includes a receive interface implemented via a network interface card (NIC) 1108 receive an unperturbed social media data set as input from one or more social media networks communicably interfaced with the DSP framework system via a network, the received unperturbed social media data set having social media data corresponding to each of a plurality of users represented therein; a data privacy engine 1125 to map the received unperturbed social media data set into a high-dimensional user-keyword matrix connecting each of the plurality of users represented with multi-variable keywords corresponding to each user's social media data within the unperturbed social media data set; in which the data privacy engine 1125 is further to inject controlled noise into the high-dimensional user-keyword matrix until a specified differential privacy threshold is attained to generate as output, a perturbed user-keyword matrix having each user's social media data and the controlled noise embodied therein; further in which the differential privacy threshold is configurable based on a level which protects each of the plurality of users' privacy during a statistical query against the perturbed user-keyword matrix having the social media data of the plurality of users embodied therein by preventing an attacker from (i) inferring whether a targeted user by the attacker is one of the plurality of users represented within the unperturbed social media data set and by further preventing the attacker from (ii) inferring whether any record is associated with the targeted user; and a transmitter implemented via the network interface card (NIC) 1108 to send the generated perturbed user-keyword matrix to one or more social media consumers over the network responsive to a request.

Such a machine 1100 implementing the Data Services Provider (DSP) Framework system further includes, according to at least one embodiment, a database system (for example, accessible via secondary memory 1118) and being communicably interfaced with the data privacy engine of the DSP system, in which the data privacy engine 1125 further is to store the perturbed user-keyword matrix generated as output in the database system; and further in which the machine 1100 is to expose the perturbed user-keyword matrix stored within the database system to statistical queries via a database interface, for example, via the user interface 1110 or the network interface card (NIC) 1108.

FIG. 12 depicts a flow diagram illustrating a method 1200 for implementing a privacy-preserving social media data outsourcing model within a computing environment such as a database system implementation supported by a processor and a memory to execute such functionality to provide cloud based on-demand functionality to users, customers, and subscribers.

Method 1200 may be performed by processing logic that may include hardware (e.g., circuitry, dedicated logic, programmable logic, microcode, etc.), software (e.g., instructions run on a processing device) to perform various operations such as executing, transmitting, receiving, analyzing, triggering, pushing, recommending, defining, retrieving, parsing, persisting, exposing, loading, operating, generating, storing, maintaining, creating, returning, presenting, interfacing, communicating, querying, processing, providing, determining, displaying, updating, sending, etc., in pursuance of the systems and methods as described herein. For example, the Data Service Provider (DSP) 120, the data aggregator 125 and the data privacy engine 130 as depicted at FIG. 1, and the other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1200 depicted at FIG. 12, at block 1205, there is depicted the operations for implementing a privacy-preserving social media data outsourcing model at a Data Services Provider (DSP) Framework system having at least a processor and a memory therein to execute stored instructions of the DSP framework system, according to the following operations:

At block 1210, processing logic receives an unperturbed social media data set as input from one or more social media networks communicably interfaced with the DSP framework system via a network, the received unperturbed social media data set having social media data corresponding to each of a plurality of users represented therein.

At block 1215, processing logic maps the received unperturbed social media data set into a high-dimensional user-keyword matrix connecting each of the plurality of users represented with multi-variable keywords corresponding to each user's social media data within the unperturbed social media data set.

At block 1220, processing logic injects controlled noise into the high-dimensional user-keyword matrix until a specified differential privacy threshold is attained to generate as output, a perturbed user-keyword matrix having each user's social media data and the controlled noise embodied therein.

At block 1225, operations indicate that the differential privacy threshold is configurable based on a level which protects each of the plurality of users' privacy during a statistical query against the perturbed user-keyword matrix having the social media data of the plurality of users embodied therein by preventing an attacker from (i) inferring whether a targeted user by the attacker is one of the plurality of users represented within the unperturbed social media data set and by further preventing the attacker from (ii) inferring whether any record is associated with the targeted user.

At block 1230, processing logic sends the generated perturbed user-keyword matrix to one or more social media consumers over the network responsive to a request.

According to another embodiment, method 1200 further includes: communicably interfacing a database system with the data privacy engine of the DSP system; storing the perturbed user-keyword matrix generated as output in the database system; and exposing the perturbed user-keyword matrix stored within the database system to statistical queries via a database interface.

According to another embodiment of method 1200, storing and exposing the perturbed user-keyword matrix via the database system maintains or improves data utility of the received unperturbed social media data set; and protects the social media data associated with the plurality of users from user-linkage attacks attempting to link random anonymous IDs in a received dataset to corresponding real IDs on a social media platform.

According to another embodiment, method 1200 further includes: receiving the request for a social media data set from one of the social media consumers via the network; returning the generated perturbed user-keyword matrix to the requesting social media consumer via the network responsive to the request; and in which the generated perturbed user-keyword matrix permits statistical queries against the social media data associated with the plurality of users represented within the unperturbed social media data set without allowing inference of either (i) whether a random anonymous ID corresponds to a real ID of one of the plurality of users represented within the perturbed user-keyword matrix or (ii) whether any record within the perturbed user-keyword matrix is associated with the random anonymous ID.

According to another embodiment of method 1200, the perturbed user-keyword matrix maps each item in the unperturbed social media data set to a unique item in the perturbed user-keyword matrix; in which real user IDs for user-texts within the perturbed user-keyword matrix are linkable with a random anonymous ID with negligible probability; and in which the queryable perturbed user-keyword matrix has a comparable utility to the received unperturbed social media data set for statistical data mining tasks.

According to another embodiment, method 1200 further includes: applying, via the data privacy engine, a dimensionality reduction operation to the high-dimensional user-keyword matrix using an ϵ-text indistinguishability to reduce a total quantity of features or variables represented by the high-dimensional user-keyword matrix.

According to another embodiment, method 1200 further includes: applying, via the data privacy engine, a stemming operation to the high-dimensional user-keyword matrix to reduce a total quantity of features or variables represented by the high-dimensional user-keyword matrix by reducing multiple forms of a word to a single word within the high-dimensional user-keyword matrix.

According to another embodiment, method 1200 further includes: applying, via the data privacy engine, a text modeling operation by filtering to the high-dimensional user-keyword matrix to reduce a total quantity of features or variables represented by the high-dimensional user-keyword matrix by identifying and eliminating words identified as general or identified as meaningless on the basis of classification accuracy for the received social media data set when using the high-dimensional user-keyword matrix in conjunction with a stop-word list.

According to another embodiment of method 1200, injecting the controlled noise into the high-dimensional user-keyword matrix to generate the perturbed user-keyword matrix further includes applying one or more of a filtering operation, a stemming operation, and a dimensionality reduction operation to the high-dimensional user-keyword matrix to reduce a total quantity of features or variables represented by the high-dimensional user-keyword matrix.

According to another embodiment of method 1200, injecting the controlled noise into the high-dimensional user-keyword matrix to generate the perturbed user-keyword matrix further includes anonymizing all real user IDs represented within the social media data set received as the input.

According to another embodiment of method 1200, injecting the controlled noise into the high-dimensional user-keyword matrix to generate the perturbed user-keyword matrix further includes preserving both link privacy and vertex privacy from the unperturbed social media data set received as input within the perturbed user-keyword matrix generated as the output such that any real user IDs within the unperturbed social media data set received as input cannot be recovered based on either vertexes or edges.

According to another embodiment of method 1200, the unperturbed social media data set received as input includes unmodified social medial data for each of the plurality of users identifying the plurality of users by the social media data associated with each of the plurality of users, including, for each identified user, at least: (i) a real user ID for the respective user and (ii) a user-supplied text posted to a social media network by the respective user.

According to another embodiment of method 1200, the DSP Framework operates within a cloud-based Data Services Provider which provides computational services to subscribers over a public Internet; and in which sending the generated perturbed user-keyword matrix to the one or more social media consumers over the network responsive to the request includes the cloud-based Data Services Provider transmitting the generated perturbed user-keyword matrix as an output dataset responsive to the received request specifying a statistical query and one or more query conditions submitted by one of the subscribers over the public Internet.

According to a particular embodiment, there is a non-transitory computer readable storage medium having instructions stored thereupon that, when executed by a Data Services Provider (DSP) Framework system having at least a processor and a memory therein, the instructions cause the DSP framework system to perform operations including: receiving an unperturbed social media data set as input from one or more social media networks communicably interfaced with the DSP framework system via a network, the received unperturbed social media data set having social media data corresponding to each of a plurality of users represented therein; mapping, via a data privacy engine, the received unperturbed social media data set into a high-dimensional user-keyword matrix connecting each of the plurality of users represented with multi-variable keywords corresponding to each user's social media data within the unperturbed social media data set; injecting, via the data privacy engine, controlled noise into the high-dimensional user-keyword matrix until a specified differential privacy threshold is attained to generate as output, a perturbed user-keyword matrix having each user's social media data and the controlled noise embodied therein; wherein the differential privacy threshold is configurable based on a level which protects each of the plurality of users' privacy during a statistical query against the perturbed user-keyword matrix having the social media data of the plurality of users embodied therein by preventing an attacker from (i) inferring whether a targeted user by the attacker is one of the plurality of users represented within the unperturbed social media data set and by further preventing the attacker from (ii) inferring whether any record is associated with the targeted user; and sending, via a transmitter of the DSP system, the generated perturbed user-keyword matrix to one or more social media consumers over the network responsive to a request.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A Data Services Provider (DSP) Framework system, comprising:
    a memory to store instructions;
    a processor to execute instructions stored within the memory;
    a receive interface to receive an unperturbed social media data set as input from one or more social media networks communicably interfaced with the DSP framework system via a network, the received unperturbed social media data set having social media data corresponding to each of a plurality of users represented therein;
    a data privacy engine to map the received unperturbed social media data set into a high-dimensional user-keyword matrix connecting each of the plurality of users represented with multi-variable keywords corresponding to each user's social media data within the unperturbed social media data set;
    the data privacy engine further to inject controlled noise into the high-dimensional user-keyword matrix until a specified differential privacy threshold is attained to generate as output, a perturbed user-keyword matrix having each user's social media data and the controlled noise embodied therein by determining a privacy budget which is proportional to a physical distance between associated geographic locations for any two users represented within the high-dimensional user-keyword matrix;
    wherein the differential privacy threshold is configurable using the privacy budget to establish a level which protects each of the plurality of users' privacy during a statistical query against the perturbed user-keyword matrix having the social media data of the plurality of users embodied therein by preventing an attacker from (i) inferring whether a targeted user by the attacker is one of the plurality of users represented within the unperturbed social media data set and by further preventing the attacker from (ii) inferring whether any record is associated with the targeted user; and
    a transmitter to send the generated perturbed user-keyword matrix to one or more social media consumers over the network responsive to a request.

2. The Data Services Provider (DSP) Framework system of claim 1, further comprising:
    a database system communicably interfaced with the data privacy engine of the DSP system;
    wherein the data privacy engine further is to store the perturbed user-keyword matrix generated as output in the database system; and
    expose the perturbed user-keyword matrix stored within the database system to statistical queries via a database interface.

3. The Data Services Provider (DSP) Framework system of claim 2, wherein storing and exposing the perturbed user-keyword matrix via the database system:
    maintains or improves data utility of the received unperturbed social media data set; and
    protects the social media data associated with the plurality of users from user-linkage attacks attempting to link random anonymous IDs in a received dataset to corresponding real IDs on a social media platform.

4. The Data Services Provider (DSP) Framework system of claim 2, wherein storing and exposing the perturbed user-keyword matrix via the database system provides social media consumers with a queryable social media data set having both high utility and high privacy.

5. The Data Services Provider (DSP) Framework system of claim 1:
    wherein the receive interface is to receive the request for a social media data set from one of the social media consumers via the network;
    wherein the transmitter is to return the generated perturbed user-keyword matrix to the requesting social media consumer via the network responsive to the request; and
    wherein the generated perturbed user-keyword matrix permits statistical queries against the social media data associated with the plurality of users represented within the unperturbed social media data set without allowing inference of either (i) whether a random anonymous ID corresponds to a real ID of one of the plurality of users represented within the perturbed user-keyword matrix or (ii) whether any record within the perturbed user-keyword matrix is associated with the random anonymous ID.

6. The Data Services Provider (DSP) Framework system of claim 1:
    wherein the perturbed user-keyword matrix maps each item in the unperturbed social media data set to a unique item in the perturbed user-keyword matrix;
    wherein real user IDs for user-texts within the perturbed user-keyword matrix are linkable with a random anonymous ID with negligible probability; and
    wherein the queryable perturbed user-keyword matrix has a comparable utility to the received unperturbed social media data set for statistical data mining tasks.

7. The Data Services Provider (DSP) Framework system of claim 1:
    wherein the data privacy engine is to further apply a dimensionality reduction operation to the high-dimensional user-keyword matrix using an $\epsilon$-text indistinguishability to reduce a total quantity of features or variables represented by the high-dimensional user-keyword matrix.

8. The Data Services Provider (DSP) Framework system of claim 1, wherein the data privacy engine is to further apply a stemming operation to the high-dimensional user-keyword matrix to reduce a total quantity of features or variables represented by the high-dimensional user-keyword matrix by reducing multiple forms of a word to a single word within the high-dimensional user-keyword matrix.

9. The Data Services Provider (DSP) Framework system of claim 1, wherein the data privacy engine is to further apply a text modeling operation by filtering to the high-dimensional user-keyword matrix to reduce a total quantity of features or variables represented by the high-dimensional user-keyword matrix by identifying and eliminating words identified as general or identified as meaningless on the basis of classification accuracy for the received social media data set when using the high-dimensional user-keyword matrix in conjunction with a stop-word list.

10. The Data Services Provider (DSP) Framework system of claim 1:
wherein the data privacy engine further to inject the controlled noise into the high-dimensional user-keyword matrix to generate the perturbed user-keyword matrix further comprises the data privacy engine to generate the perturbed user-keyword matrix by applying one or more of a filtering operation, a stemming operation, and a dimensionality reduction operation to the high-dimensional user-keyword matrix to reduce a total quantity of features or variables represented by the high-dimensional user-keyword matrix.

11. The Data Services Provider (DSP) Framework system of claim 1:
wherein the data privacy engine further to inject the controlled noise into the high-dimensional user-keyword matrix to generate the perturbed user-keyword matrix further comprises the data privacy engine to anonymize all real user IDs represented within the social media data set received as the input.

12. The Data Services Provider (DSP) Framework system of claim 1, wherein the data privacy engine to inject controlled noise into the user-keyword matrix comprises the data privacy engine to preserve both link privacy and vertex privacy from the unperturbed social media data set received as input within the perturbed user-keyword matrix generated as the output such that any real user IDs within the unperturbed social media data set received as input cannot be recovered based on either vertexes or edges.

13. The Data Services Provider (DSP) Framework system of claim 1, wherein the unperturbed social media data set received as input comprises unmodified social medial data for each of the plurality of users identifying the plurality of users by the social media data associated with each of the plurality of users, including, for each identified user, at least: (i) a real user ID for the respective user and (ii) a user-supplied text posted to a social media network by the respective user.

14. The Data Services Provider (DSP) Framework system of claim 1:
wherein the DSP Framework operates within a cloud-based Data Services Provider which provides computational services to subscribers over a public Internet; and
wherein the transmitter to send the generated perturbed user-keyword matrix to the one or more social media consumers over the network responsive to the request comprises the cloud-based Data Services Provider transmitting the generated perturbed user-keyword matrix as an output dataset responsive to the received request specifying a statistical query and one or more query conditions submitted by one of the subscribers over the public Internet.

15. A method for implementing a privacy-preserving social media data outsourcing model at a Data Services Provider (DSP) Framework system having at least a processor and a memory therein to execute stored instructions of the DSP framework system, wherein the method comprises:
receiving an unperturbed social media data set as input from one or more social media networks communicably interfaced with the DSP framework system via a network, the received unperturbed social media data set having social media data corresponding to each of a plurality of users represented therein;
mapping, via a data privacy engine, the received unperturbed social media data set into a high-dimensional user-keyword matrix connecting each of the plurality of users represented with multi-variable keywords corresponding to each user's social media data within the unperturbed social media data set;
injecting, via the data privacy engine, controlled noise into the high-dimensional user-keyword matrix until a specified differential privacy threshold is attained to generate as output, a perturbed user-keyword matrix having each user's social media data and the controlled noise embodied therein by determining a privacy budget which is proportional to a physical distance between associated geographic locations for any two users represented within the high-dimensional user-keyword matrix;
wherein the differential privacy threshold is configurable using the privacy budget to establish a level which protects each of the plurality of users' privacy during a statistical query against the perturbed user-keyword matrix having the social media data of the plurality of users embodied therein by preventing an attacker from (i) inferring whether a targeted user by the attacker is one of the plurality of users represented within the unperturbed social media data set and by further preventing the attacker from (ii) inferring whether any record is associated with the targeted user; and
sending, via a transmitter of the DSP system, the generated perturbed user-keyword matrix to one or more social media consumers over the network responsive to a request.

16. The method of claim 15, further comprising:
communicably interfacing a database system with the data privacy engine of the DSP system;
storing the perturbed user-keyword matrix generated as output in the database system; and
exposing the perturbed user-keyword matrix stored within the database system to statistical queries via a database interface.

17. The method of claim 15, further comprising:
receiving the request for a social media data set from one of the social media consumers via the network;
returning the generated perturbed user-keyword matrix to the requesting social media consumer via the network responsive to the request; and
wherein the generated perturbed user-keyword matrix permits statistical queries against the social media data associated with the plurality of users represented within the unperturbed social media data set without allowing inference of either (i) whether a random anonymous ID corresponds to a real ID of one of the plurality of users represented within the perturbed user-keyword matrix or (ii) whether any record within the perturbed user-keyword matrix is associated with the random anonymous ID.

18. Non-transitory computer readable storage media having instructions stored thereupon that, when executed by a Data Services Provider (DSP) Framework system having at least a processor and a memory therein, the instructions cause the DSP framework system to perform operations comprising:

receiving an unperturbed social media data set as input from one or more social media networks communicably interfaced with the DSP framework system via a network, the received unperturbed social media data set having social media data corresponding to each of a plurality of users represented therein;

mapping, via a data privacy engine, the received unperturbed social media data set into a high-dimensional user-keyword matrix connecting each of the plurality of users represented with multi-variable keywords corresponding to each user's social media data within the unperturbed social media data set;

injecting, via the data privacy engine, controlled noise into the high-dimensional user-keyword matrix until a specified differential privacy threshold is attained to generate as output, a perturbed user-keyword matrix having each user's social media data and the controlled noise embodied therein by determining a privacy budget which is proportional to a physical distance between associated geographic locations for any two users represented within the high-dimensional user-keyword matrix;

wherein the differential privacy threshold is configurable using the privacy budget to establish a level which protects each of the plurality of users' privacy during a statistical query against the perturbed user-keyword matrix having the social media data of the plurality of users embodied therein by preventing an attacker from (i) inferring whether a targeted user by the attacker is one of the plurality of users represented within the unperturbed social media data set and by further preventing the attacker from (ii) inferring whether any record is associated with the targeted user; and sending, via a transmitter of the DSP system, the generated perturbed user-keyword matrix to one or more social media consumers over the network responsive to a request.

19. The non-transitory computer readable storage media of claim 18, wherein the instructions when executed by the processor cause the Data Services Provider (DSP) Framework system to perform further operations, including:

communicably interfacing a database system with the data privacy engine of the DSP system;

storing the perturbed user-keyword matrix generated as output in the database system; and exposing the perturbed user-keyword matrix stored within the database system to statistical queries via a database interface.

20. The non-transitory computer readable storage media of claim 18:

wherein storing and exposing the perturbed user-keyword matrix via the database system maintains or improves data utility of the received unperturbed social media data set and protects the social media data associated with the plurality of users from user-linkage attacks attempting to link random anonymous IDs in a received dataset to corresponding real IDs on a social media platform.

* * * * *